United States Patent

Yabe

[11] Patent Number: 5,769,218
[45] Date of Patent: Jun. 23, 1998

[54] STORAGE AND SAFETY DEVICE FOR ARTICLE BEING STORED

[75] Inventor: Isao Yabe, Tanashi, Japan

[73] Assignee: Citizen Watch Co., Ltd., Tokyo, Japan

[21] Appl. No.: 649,625

[22] PCT Filed: Sep. 7, 1995

[86] PCT No.: PCT/JP95/01782

§ 371 Date: May 24, 1996

§ 102(e) Date: May 24, 1996

[87] PCT Pub. No.: WO96/09969

PCT Pub. Date: Apr. 4, 1996

[30] Foreign Application Priority Data

Sep. 27, 1994 [JP] Japan .................................. 6-231444
Nov. 22, 1994 [JP] Japan .................................. 6-287632
Mar. 3, 1995 [JP] Japan .................................. 7-043710

[51] Int. Cl.[6] .............................................. B65D 85/57
[52] U.S. Cl. .............................. 206/308.2; 206/387.11; 206/1.5
[58] Field of Search ........................ 206/307, 308.2, 206/387.11, 807, 1.5

[56] References Cited

U.S. PATENT DOCUMENTS 4,285,429 8/1981 MacTavish .
4,572,369 2/1986 Morris ................................. 206/387.11
4,714,161 12/1987 Thorud ................................. 206/387.11
4,759,442 7/1988 Gregerson et al. ................. 206/387.11
4,819,797 4/1989 Holmgren ............................ 206/308.2
5,039,982 8/1991 Bruhwiler ................................ 206/1.5
5,289,914 3/1994 Holmgren ............................ 206/387.11
5,375,712 12/1994 Weisburn ............................. 206/387.11
5,524,752 6/1996 Mazzucchelli ....................... 206/308.2

FOREIGN PATENT DOCUMENTS 0 402 822 6/1989 European Pat. Off. .
2688483 9/1993 France ................................ 206/308.2

Primary Examiner—David T. Fidei
Attorney, Agent, or Firm—Kanesaka & Takeuchi

[57] ABSTRACT

A storage and safety device includes an enclosure frame for storing an article being stored, a lock mechanism for locking the article contained in the enclosure frame so as not to allow the article to be taken out, and a release jig for releasing the lock mechanism. The enclosure frame is a parallelepiped having two pairs of side frames, upper and lower frames, one of which is formed with an opening for insertion and taking-out of the article being stored, and the interior configuration of the enclosure frame is sized to enable the article being stored to move. The lock mechanism is constructed to be integral with the enclosure frame and can be inserted into and removed from a gap formed between the article contained in the enclosure frame and one of the side frames.

27 Claims, 28 Drawing Sheets

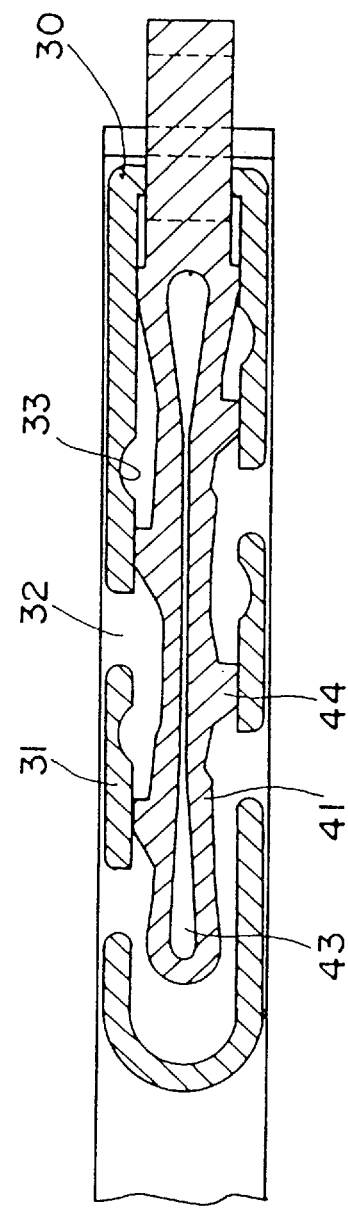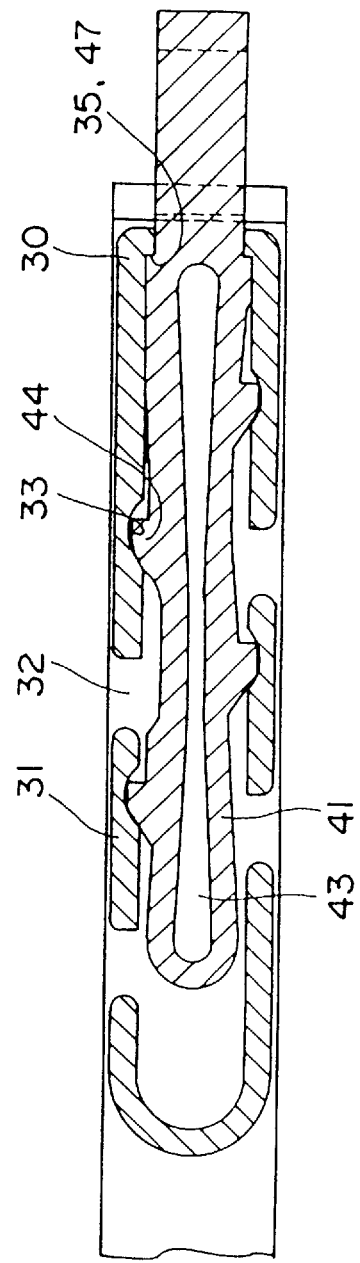

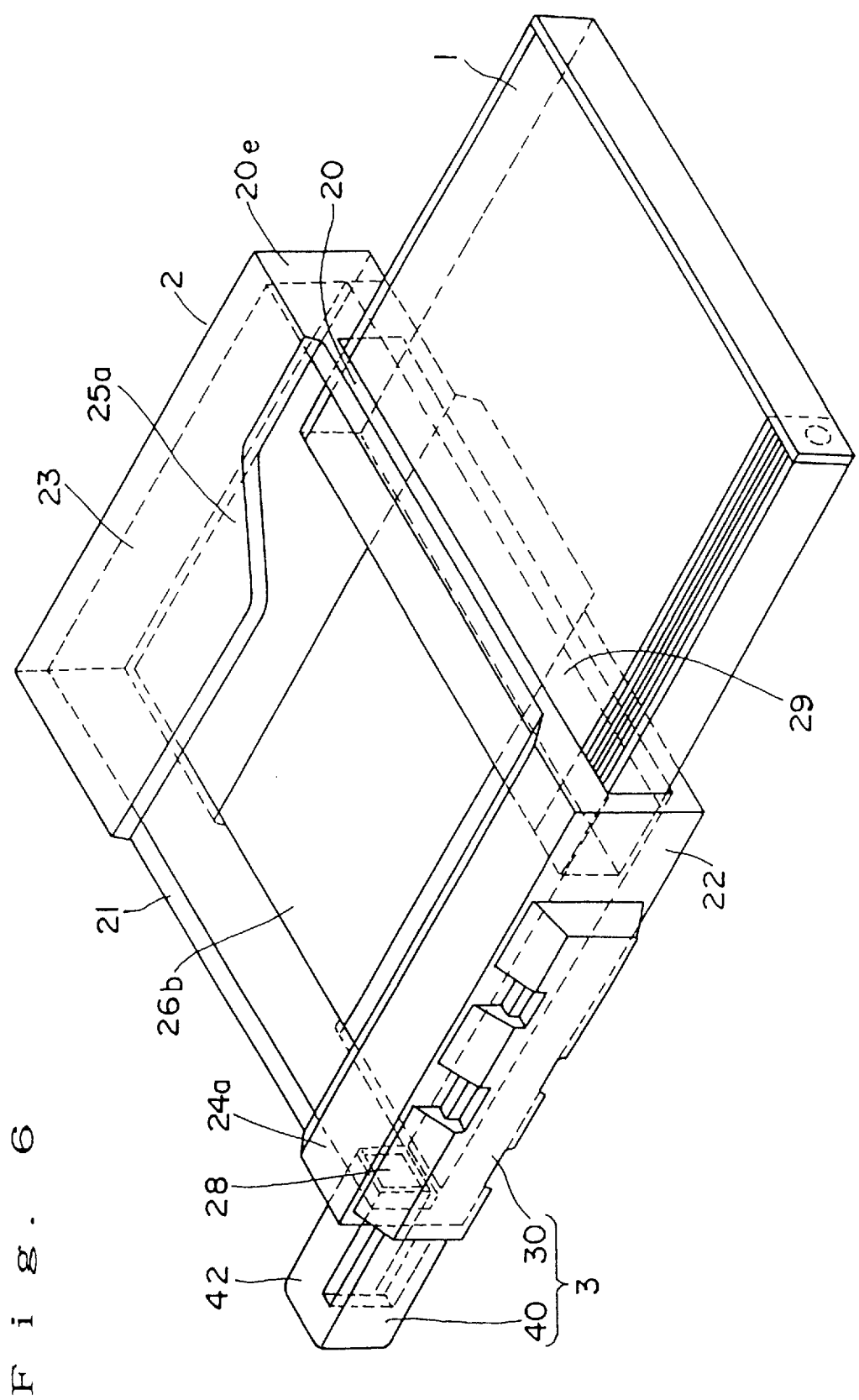

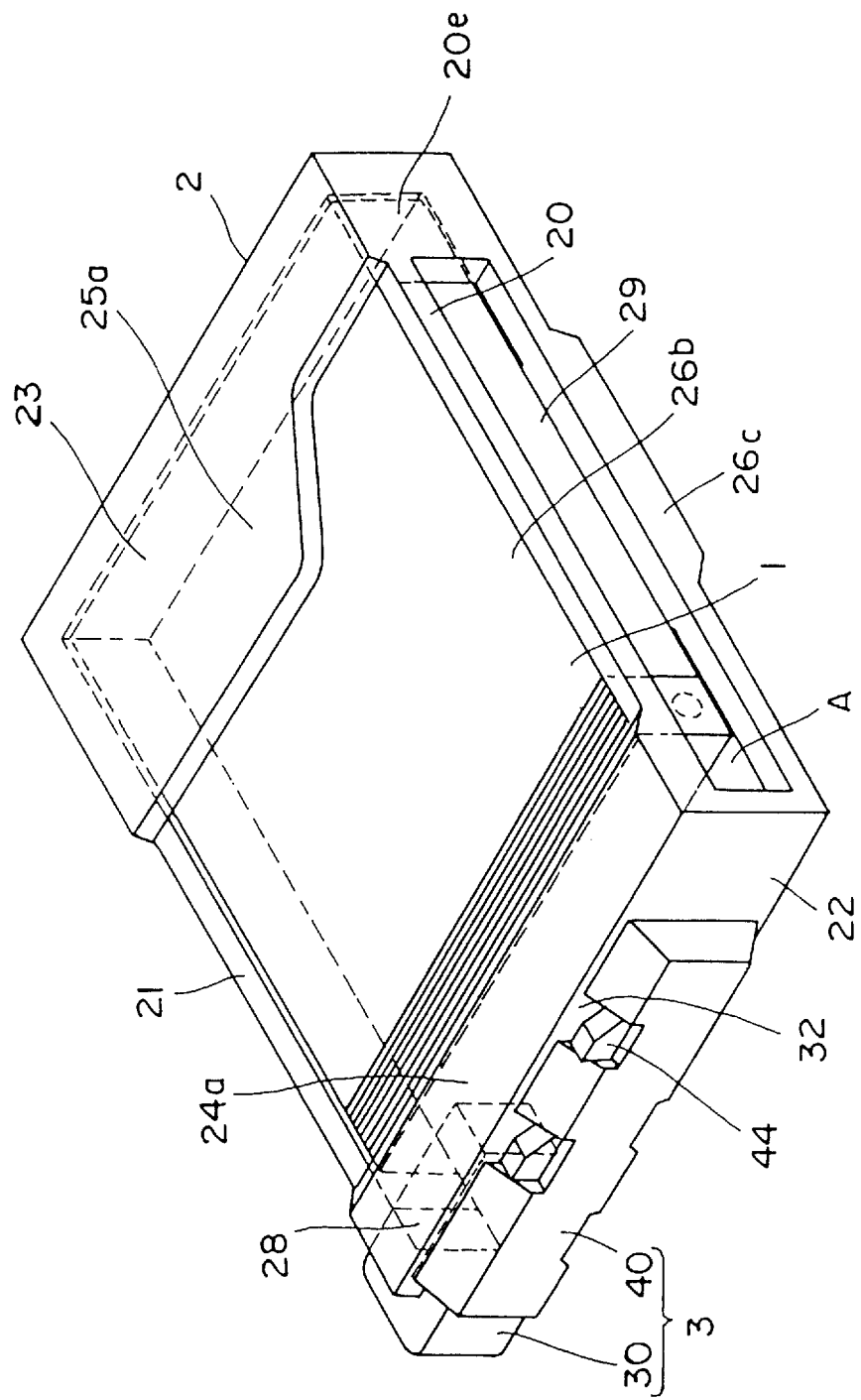

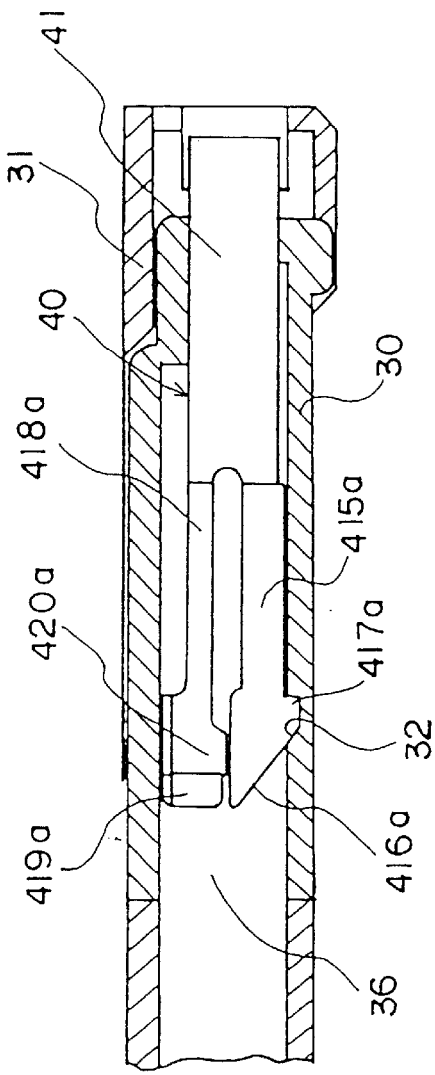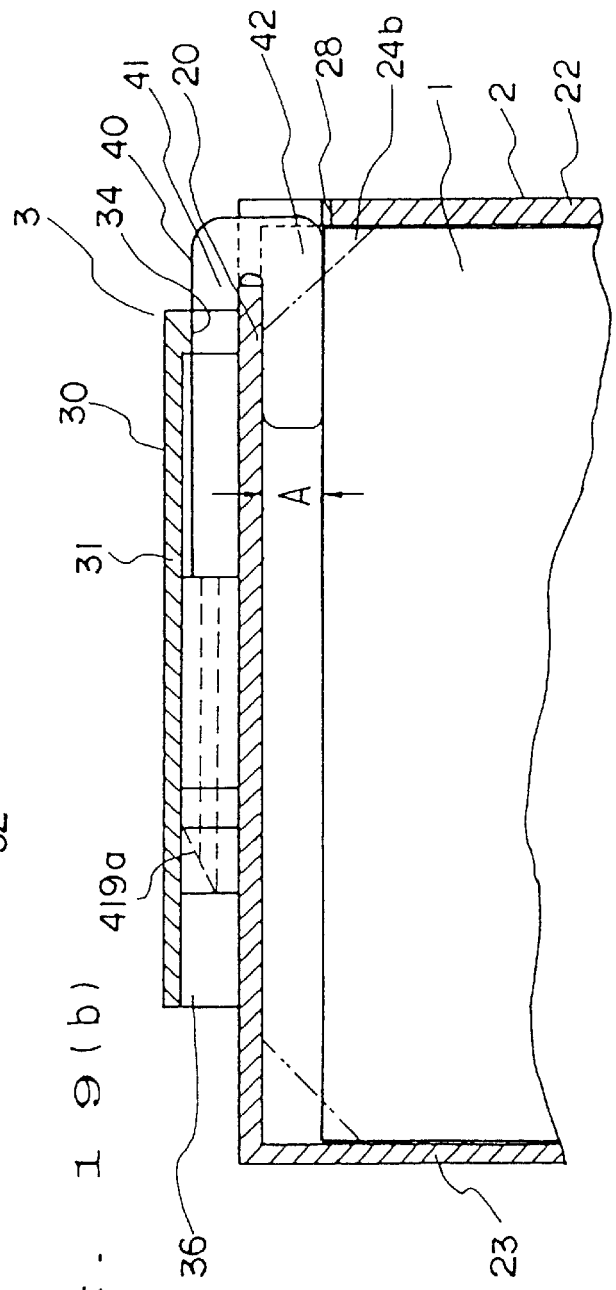
Fig. 19(a)
Fig. 19(b)

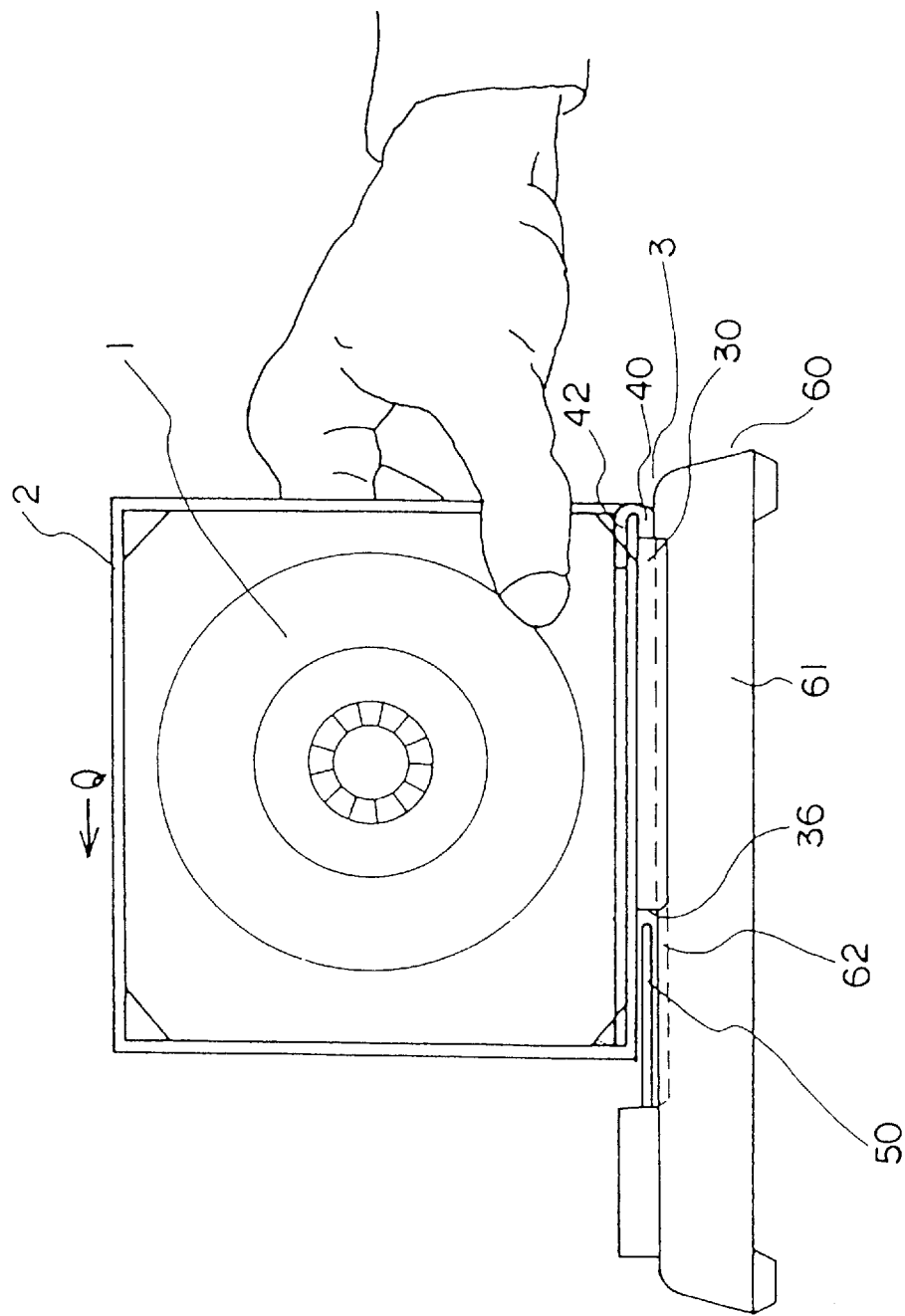

STORAGE AND SAFETY DEVICE FOR ARTICLE BEING STORED

BACKGROUND OF THE INVENTION

[Field of Art]

The present invention relates to a storage and safety device which prevents the articles being displayed in stores, such as compact disks, cassette tapes, and other articles, from being shoplifted.

In recent years compact disks, cassette tapes (audio tapes and video tapes), and other similar articles are overflowed on the market, and the number of shops selling these articles have increased. These shops are designed to enable customers to readily and comfortably choose the discs being purchased and to allow them to freely access to the discs. On the other hand, the discs are small sized since compact discs have been introduced into the market, so that a measure for preventing the compact discs from being shoplifted has become a serious problem for the shops.

To effectively prevent shoplifting, a sensor which actuates an electric alarm system is installed in a box in which compact discs or cassette tapes are stored. The sensor reacts to actuate the alarm system if the box together with the discs stored therein is taken out of the shop.

In this system, however, if the discs are taken out of the box and lifted from the shop with the empty box being left on the shelf, the alarm system is not actuated, failing to prevent shoplifting.

For this reason, it is necessary to provide a safety device which makes it difficult for the customers to take the discs from the box and to combine this safety device with the above-mentioned sensor. This type of storage and safety device must be manufactured at a low cost and must be difficult to be opened by customers, while being easily handled by shop personnel. In addition, the use of the storage and safety device of cassettes or the like should not interfere with other goods and articles.

Several storage and safety devices have been developed to satisfy these requirements. Japanese Patent Application Laid-Open No. 502442/1992 discloses a storage and safety device for common cassettes. This storage and safety device is provided with a lock member outside the enclosure of the cassette to lock by engagement with the cassette and a latch means which is operated by magnetic power. The lock member is provided with a rotating bolt which is housed in a lock housing. The rotating bolt has a structure to be adjusted in an engaged position or a released position from outside the lock housing.

This device, however, has problems undesirable for the shops. That is, the nail of the rotating bolt breaks cellophane packing the cassette in the locked state, thereby reducing the commercial value of the product. In addition, the strong magnetic power applied when releasing the lock adversely affects other products sold in the shop.

As a technology for solving these problems, U.S. Pat. No. 4,285,429 discloses a storage and safety device having a frame for enclosing the cassette being stored, in which a gap is formed between the frame and the cassette stored. A lock member provided separately from the frame is inserted into this gap, whereby the device is locked so that the cassette cannot be taken out from the frame. This device, therefore, has not the problems of breaking the cellophane or of adversely affecting other products by the strong magnetic power.

However, because this device has two separate members, one a frame for enclosing the cassette and the other a lock member for preventing the cassette from being taken out from the frame, locking operation cannot be performed by one-touch. In addition to this operational problem, there is a problem that the lock member may be lost.

The present invention has been completed by the research and development to solve these problems, and has an object of providing a storage and safety device having a lock mechanism for preventing the article being stored (such as a cassette) contained in the frame from being taken out, formed integrally with the frame, whereby locking operation is performed by one-touch and the risk of losing the lock member is prevented.

Another object of the present invention is to provide a storage and safety device which can store the articles being stored without damaging cellophane packing the articles, and thus without decreasing the external commercial value of these articles.

BRIEF DESCRIPTION OF THE DRAWINGS

FIG. 4 is a cross-sectional view of the lock mechanism of FIG. 1, wherein the lock mechanism is in an intermediate position of lock release.

FIG. 5 is a cross-sectional view of the lock mechanism of FIG. 1, wherein the lock mechanism is in a second stable position of complete lock release.

FIG. 6 is a perspective view of a second embodiment of the device of the present invention, showing the state wherein a CD case is being inserted in a hard case.

FIG. 7 is a perspective view of the same device as shown in FIG. 6, showing the device in a locked state.

FIGS. 19(a) and 19(b) show a plan sectional view and a side sectional view, respectively, of a sixth embodiment of the device of the present invention, wherein the lock mechanism is in a locked state.

FIG. 31 is a drawing illustrating the use of the lock release device using a lock release jig in the above-described embodiments of the present invention.

BEST EMBODIMENTS FOR CARRYING OUT THE INVENTION

Figure 1:
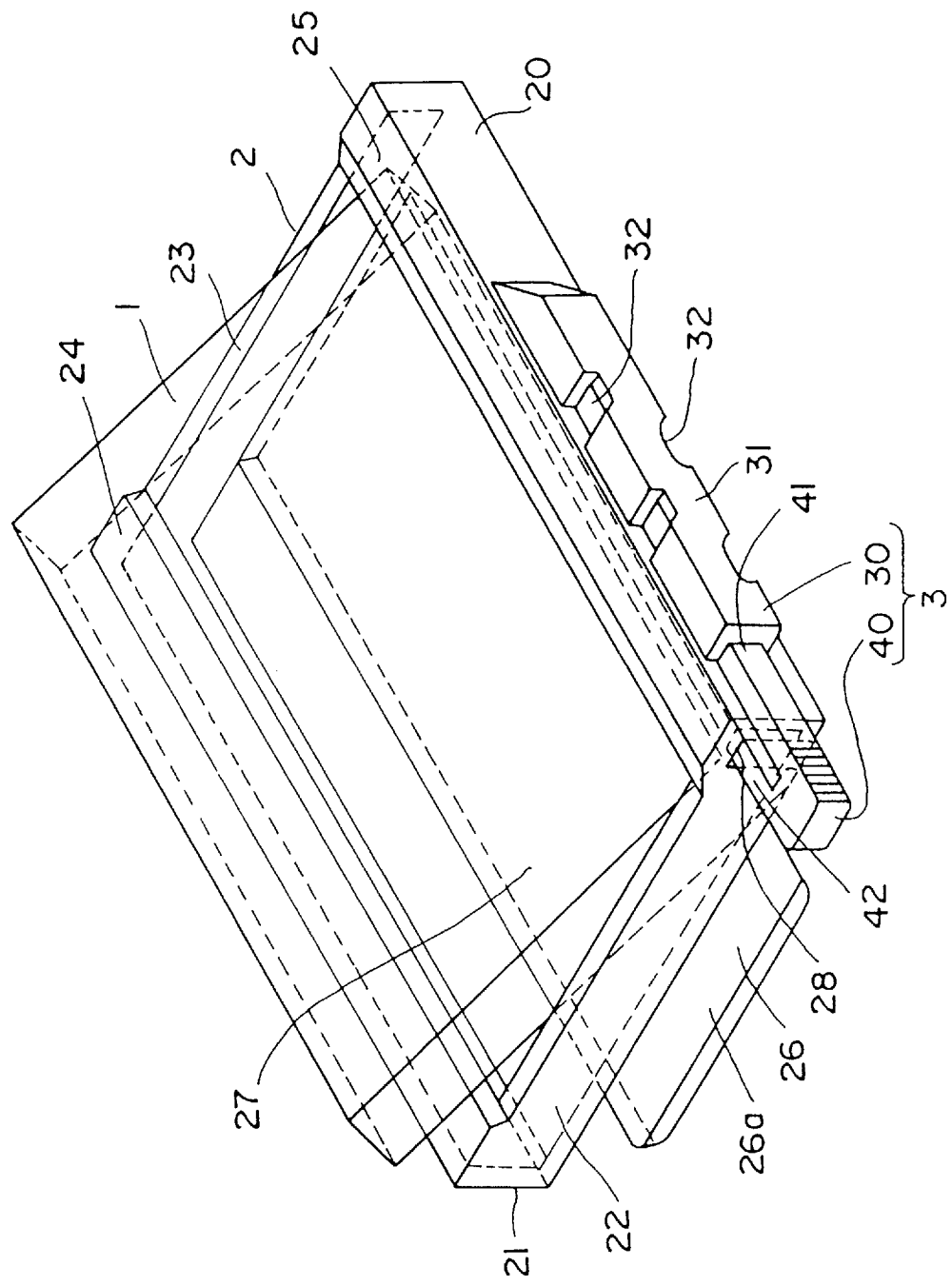
FIG. 1 is a perspective view of a first embodiment of the device of the present invention, showing the state wherein a CD (compact disc) case is being inserted in a hard case.

The embodiments of the present invention will be hereinafter described in detail referring to the drawings. These embodiments, however, shall not be construed to be limiting of the present invention.

[First embodiment]

Figure 2:
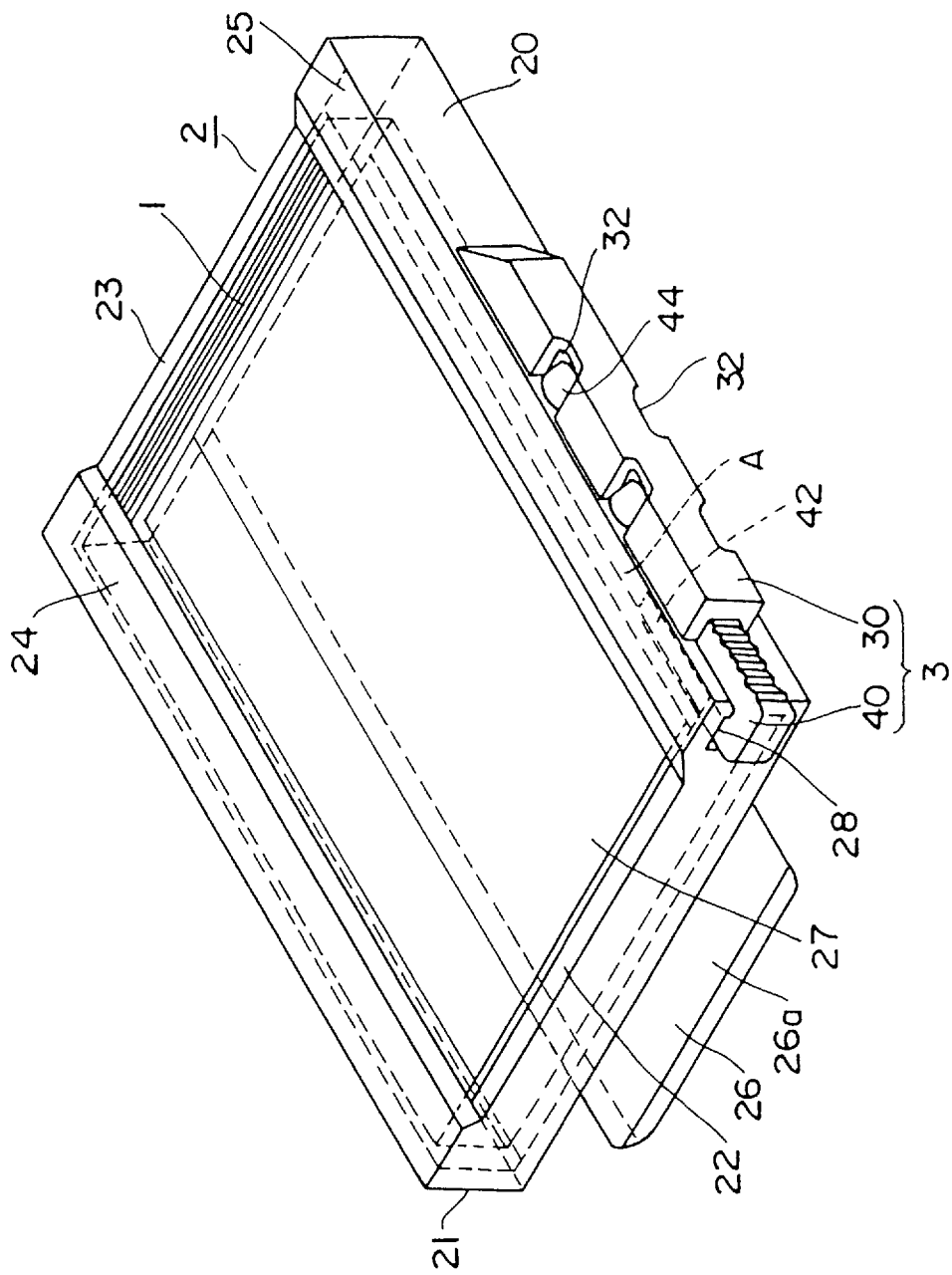
FIG. 2 is a perspective view of the same device as shown in FIG. 1, showing that the device is in a locked state.
Figure 3A:
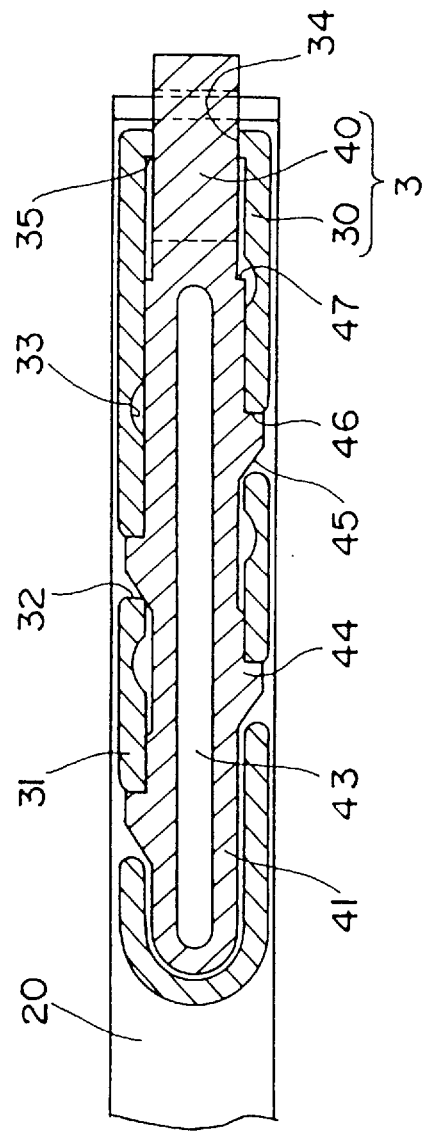
FIG. 3($a$) is a cross-sectional view of the lock mechanism of FIG. 1, wherein the lock mechanism is in a first stable position of lock, and FIG. 3($b$) is a partial cross-sectional view of the lock key.
Figure 3B:
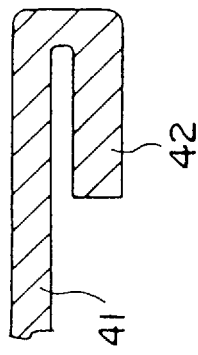

FIGS. 1–5 show the first embodiment of the present invention, wherein FIG. 1 is a perspective view showing the state wherein a CD case is being inserted into a hard case; and FIG. 2 is a perspective view showing that the device is in a locked state. FIGS. 3–5 are drawings for illustrating the lock mechanism, wherein FIG. 3 shows the lock mechanism in a stable position of lock; FIG. 4, in an intermediate position of lock release; and FIG. 5, in a stable position of complete lock release.

In this embodiment, as shown in FIGS. 1 and 2, a CD case 1 which is an article being stored is stored in a hard case 2 which is an enclosure frame.

Here, both the CD case 1 and the hard case 2 are preferably made of a plastic material such as polycarbonate by injection molding. It is desirable that the material is transparent.

The hard case 2 is a parallelepiped having two pairs of side frames 20, 21, and 22, 23, and upper and lower frames. The upper frame for the hard case 2 consists of two upper protection walls 24, 25 which are formed over the both ends of a pair of side frames 22, 23. An opening 27 for insertion and removal of CD case is formed to be surrounded by these two upper protection walls 24, 25. Accordingly, this opening 27 for insertion and removal of CD case is formed in the upper side of the hard case 2 so that it has a smaller plane configuration than the plane configuration of the CD case 1.

The lower frame for the hard case 2 consists of a lower protection wall 26, which is formed over almost the center of the pair of side frames 22, 23. This lower protection wall 26 is formed so as to prevent said CD case 1 from being falling out and to help the CD case 1 to be easily taken out, in such a manner that the same is not layered in the same plane as said two upper protection walls 24, 25 and to the same direction as the direction of these protection walls and, in addition, facing vis-a-vis said opening 27 for insertion and removal of CD case.

In addition, the interior configuration of the hard case 2 is large enough for the CD case 1 to move therein.

For example, when a plurality of hard cases 2 of this construction are placed for display to the same direction on a shelf in a shop, said lower protection wall 26 is inserted into the opening 27 for insertion and removal of CD case, thereby saving a space corresponding to the thickness of one protection wall. This is an advantage for the shop where a number of the hard cases 2 are to be placed for display.

A handle 26a projecting from one end of the lower protection wall 26 is provided to make it easy to draw out the hard cases 2 displayed in a shelf of a shop.

Furthermore, formed on one end of the side frame 22 where the lock mechanism 3 is provided is a gap bar insertion opening 28 for insertion and removal of the gap bar 42 for a lock key 40 that is hereinafter described.

The lock mechanism 3 which locks the hard case 2 to prevent the CD case 1 from being taken out is formed from a lock housing 30 and a lock key 40, as shown in FIG. 3. The lock key 40 is made of a plastic material, for example, by injection molding of elastic polyacetal resin. Specifically, the lock key 40 consists of a long plate of lock key main body 41 and a gap bar 42 with a cross-sectional shape of character U provided at one end of this lock key main body 41.

The lock key main body 41 is provided with a spring force by forming a long hole 43 along the center of the long plate. Further, provided along the both sides of the long hole 43 are a plurality of (e.g. four) key hooks 44 with a convex shape. This convex shape of the key hook allows an insertion slant 45 to be provided in the insertion direction and a stopper vertical wall 46 to be provided in the draw-out direction of the lock housing 30 of the lock key 40.

Furthermore, formed on the base of the lock key main body 41 is a loose-out-proof step 47 which engages the stopper formed at the insertion port for a hereinafter described lock housing 30 when the lock key is drawn out for releasing lock.

The lock housing 30 is made of a plastic material, for example, by injection molding of the same polycarbonate as used for manufacturing the aforementioned hard case 2. Specifically, formed in the lock housing 30 are a rectangular housing part 31 which regulates a slide position when said lock key main body 41 is inserted and, along the both walls of the housing part 31, a plurality of (e.g. four) locking concave parts 32 and releasing concave parts 33 in positions corresponding to the key hooks 44 which are formed in said lock key main body 41. In addition, a stopper 35 is formed in the opening 34 for allowing the lock key main body 41 formed on the lock housing 30 to enter or go out.

It is desirable that the lock housing 30 is made of a material, such as a colored plastic, which prevents interior of the lock mechanism from being seen from outside.

While the lock key 41 is installed in the housing 31 of the lock housing 30 and the gap bar 42 of lock key 40 is fabricated in the gap bar insertion opening 28 of the side frame for the hard case 2, the lock mechanism 3 is integrally attached to one end of the side frame 20 for the hard case 2 by a bonding means such as ultrasonic fusion or other adhesive means.

The lock key main body 41 is arranged in the housing part 31 such that it takes the first stable position of locked state when the key hook 44 engages the locking concave part 32 (FIG. 3) and a second stable position of complete release state when the key hook 44 engages the release concave part 33 (FIG. 5).

The construction of the hard case 2 and the lock mechanism 3 have been illustrated in detail in the above descriptions. Their operation will now be described.

First, as shown in FIG. 1, while lock key 40 has been drawn out and takes a complete release state, a CD case 1 is allowed to diagonally inserted from the opening 27 for insertion and removal of CD case provided on the upper surface of the hard case 2. The CD case is then moved to the side of the side frame 21 on the opposite side of the lock mechanism 3. Because the interior configuration of the hard case 2 is large enough to allow CD case 1 to move, it is possible for a certain gap A to be created between the side of the CD case 1 and the side frame 20.

Next, as shown in FIGS. 2 and 3, when lock key 40 is pushed forward until it stops, the gap bar 42 comes into the gap A between the side of the CD case 1 and the side frame 20 (FIG. 2). In this instance, the lock key main body 41 can be smoothly inserted into housing part 31 while bending due to its springing force guided by insertion slant 45 for the key hook 44, and the four key hooks 44 are locked in the locking concave parts 32 of the housing part 31. In this state, the lock mechanism 3 is locked at the first stable position. That is, the lock key 40 is prevented from being removed by the engaging vertical wall 46 which is provided in the key hook 44 even if the lock key 40 is pulled.

In this locked state the CD case 1 cannot move within the hard case 2 due to the gap bar 42 for the lock key 40. In addition, because the opening 27 for insertion and taking out of the CD case formed by the upper protection walls 24, 25 is narrower in width than the CD case 1, it is impossible to take out the CD case 1.

Next, in order to release the lock the outside of said four key hooks 44 are simultaneously pushed in against the spring force of the lock key main body 41 using a special jig which is not shown in the drawing to bend the lock key main body 41, whereby the engaging vertical wall 46 for key hooks 44 is released from the locking concave part 32. Thereafter, the lock key 40 is pulled out of the lock housing 30, whereby the lock key main body 41 slides and the hook is released from the intermediate position of released state as shown in FIG. 4. The special jig may be any type of jig inasmuch as the same has a structure which enables the four key hooks 44 to be pushed inwardly at the same time.

When the lock key 40 is further drawn out so that the loose-out-proof step 47 for the lock key 40 engages the stopper 35 of the lock housing 30, the four key hooks 44 take a stable position wherein these sections are inserted in the releasing concave part 33 due to the spring force of the lock key main body as shown in FIG. 5. In this state, the gap bar 42 is also completely drawn out of the gap A between the CD case 1 and the side frame 20 and the lock mechanism takes a second stable position of complete release.

In this second stable position of complete release, the lock key main body 41 with spring capability is released from the intermediate position of release with no excess stress being imposed thereto. Accordingly, the spring function of the lock key main body 41 is maintained for a long period of time without being lost, thereby ensuring reliability of the lock mechanism.

When the lock is released and the gap bar 42 is drawn out, again creating the gap A between the hard case 2 and the CD case 1 as mentioned above, it becomes possible for the CD case 1 to move within the hard case 2. Then, the CD case 1 can be removed from the hard case 2 by the operation reverse to the operation which has been done when inserting the CD case 1. That is to say, if the CD case 1 is placed close to the side frame 20 and pushed up from the lower protection wall 26, the CD case 1 can be very easily taken out from the hard case 2.

[Second embodiment]

FIGS. 6 and 7 show a second embodiment of the present invention, wherein FIG. 6 is a perspective view showing the state wherein a CD case is being inserted in a hard case; and FIG. 7 is a perspective view showing that the device is in a locked state. The lock mechanism is the same as that of the first embodiment.

The difference between the first embodiment and this embodiment is that this second embodiment is provided with an opening 29 for insertion and removal of CD case on one of the pair of side frames 20 and 21 (the side frame 20 in this case) for the hard case 2, while leaving the side protection wall 20e. This opening 29 for insertion and removal of CD case has a space large enough for the CD case 1 to be easily inserted and removed. In addition, the lock mechanism 3 is integrally attached to one of the other pair of side frames 22 and 23 (the side frame 22 in this case) by a bonding means such as ultrasonic fusion or other adhesive means in the same manner as in the first embodiment.

In order to insert the CD case 1 into the hard case 2 in this embodiment, as shown in FIG. 6, while the lock key 40 has been drawn out and takes a complete release state, a CD case 1 is allowed to be inserted from the opening 29 for insertion and removal of CD case. The CD case is then moved close to the side of the side frame 23 to create a certain gap A between the side frame 22 opposing to the side frame 23 and the CD case 1. The gap bar 42 is inserted into this gap A. The presence of the gap bar 42 in the gap A makes it impossible for the CD case 1 to move within the hard case 2 and to take it out from the enclosure surrounded by the side protection wall 20e, upper protection walls 24a, 25a, and the lower protection wall 26b.

Illustration for the lock mechanism 3 is omitted because the mechanism is the same as that of the first embodiment.

In the same manner as in the first embodiment, because the upper protection walls 24a, 25a, and the lower protection wall 26b are formed to the same direction so that these are not layered in the same plane, when a plurality of these hard cases 2 are placed for display to the same direction on a shelf in a shop, said lower protection wall 26b is inserted into the gap between the upper protection walls 24a, 25a on the hard case 2 next thereto, thereby saving a space corresponding to the thickness of one protection wall.

As illustrated above, using the storage and safety device for articles being stored in the first and second embodiments of the present invention, in which the hard case is integrally attached to the lock mechanism, the operation of the lock mechanism can be performed very easily and, in addition, the lock mechanism is prevented from being lost.

In addition, there is no risk that cellophane packing the CD case is damaged by the lock mechanism, so that in no case the outward appearance will be impaired and the commercial value of the articles will be decreased.

Further, because the lower protection wall of a hard case is inserted into the space between the two upper protection walls of the next hard case, not only the space for the display is saved but also the CD case can be drawn out easily when a great number of hard cases are placed on a shelf of a shop.

Furthermore, because the lock mechanism does not use a strong magnetic force, there are no adverse effects on other goods sold in the shop which should not be exposed to a magnetic power. Sales clerks are released from the affairs which may otherwise cause troubles.

[Third embodiment]

Figure 8:
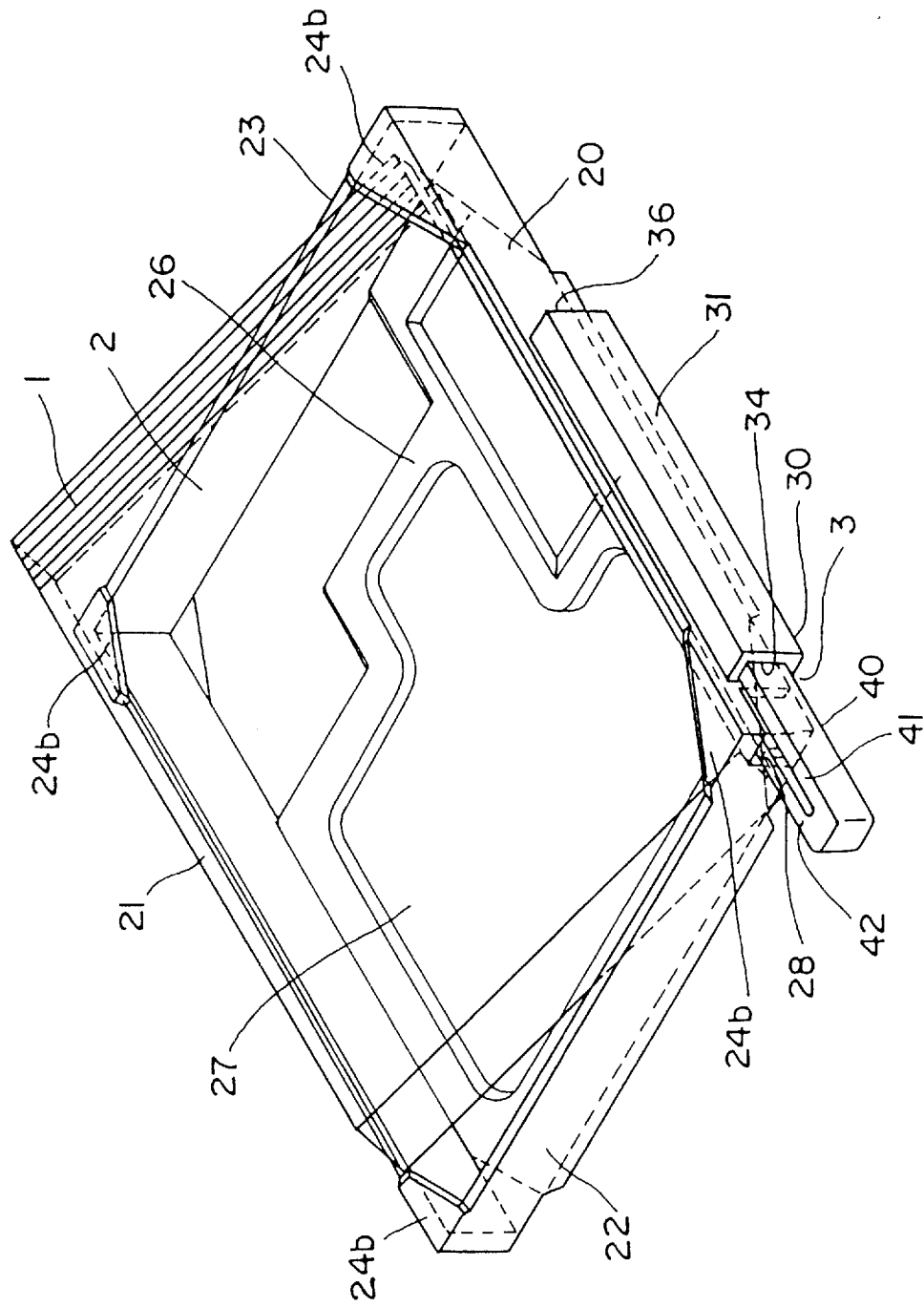
FIG. 8 is a perspective view of a third embodiment of the device of the present invention, showing the state wherein a CD case is being inserted in a hard case.
Figure 9:
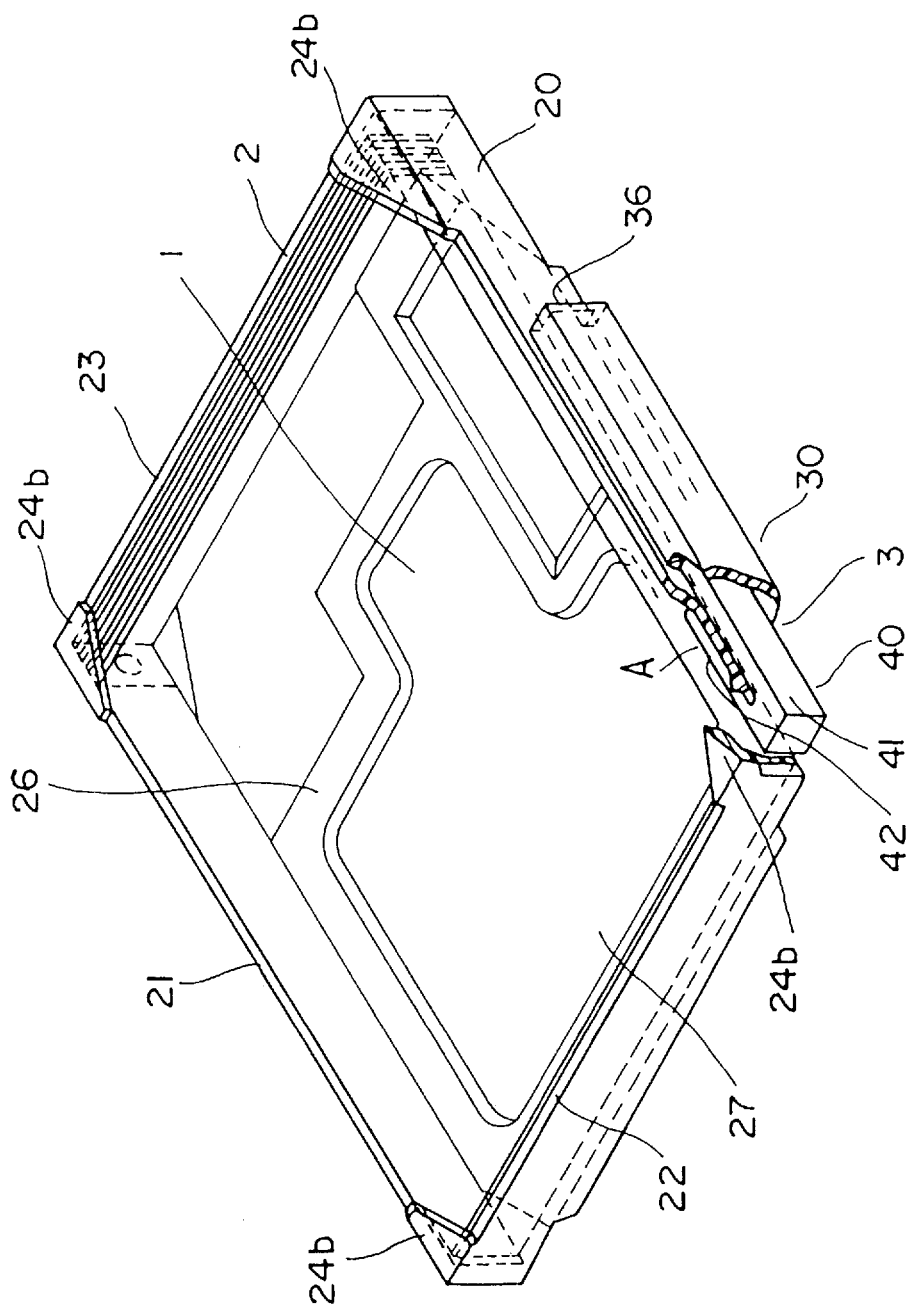
FIG. 9 is a partially broken perspective view of the same device as shown in FIG. 8, showing the device in a locked state.

FIGS. 8 and 9 show a third embodiment of the present invention, wherein FIG. 8 is a perspective view showing the state wherein a CD case is being inserted in a hard case; and FIG. 9 is a perspective view showing the CD case being housed in the hard case and locked.

The hard case 2 in this embodiment is also a parallelepiped having two pairs of side frames 20, 21, and 22, 23, and upper and lower frames. The parallelepiped is configured to provide a sufficient space for the CD case to move therein. Formed on the upper surface of the hard case 2 are eaves of upper surface corner protection walls 24b at four corners. An opening 27 for insertion and removal of CD case is formed to be surrounded by the eaves of upper surface corner protection wall 24b. The opening 27 for insertion and removal of CD case is formed so that it has a smaller plane shape than the plane shape of the CD case 1.

One lower surface protection wall 26 is formed on the lower surface of the hard case 2 in the manner such that the lower surface protection wall 26 protects the CD case 1 from dropping out. In addition, the lower surface protection wall 26 is formed so as not to be layered on the same plane as the upper surface protection wall 26 and facing vis-a-vis the opening 27 for insertion and removal of CD case, thereby affording an advantage when the hard case is molded by injection molding. In addition, the interior configuration of the hard case 2 is large enough for the CD case 1 to move therein.

A lock mechanism 3 is integrally formed in the side frame 20. In addition, a gap bar insertion port 28 for entrance and exit of gap bar 42 for the lock key 40, hereinafter described, is formed on the linkage side end of the lock mechanism of the side frame 22.

Accordingly, when the CD case 1 is to be inserted into or removed from the hard case 2, the lock mechanism is brought into a complete release state and the CD case 1 is allowed to diagonally inserted from the opening 27 for insertion and removal of CD case provided on the upper surface in such a manner that the CD case comes into contact with the side frame 20 on the opposite side. The CD case is then moved close to the side of the side frame 21 on the opposite side of the lock mechanism 3 to create a certain gap A between the side of the CD case 1 and the side frame 20. Lock is effected by causing the gap bar 42 of the lock mechanism 3 to be present in this gap.

As shown in FIGS. 8 and 9, because the hard case 2 is rigid and has upper corner protection walls 24b formed at four corners, extraordinary force trying to forcibly fold the hard case 2 would fail to bend the hard case 2. Therefore, it is impossible to intentionally take out the hard case from the opening 28 for insertion and removal of CD case.

Figure 10:
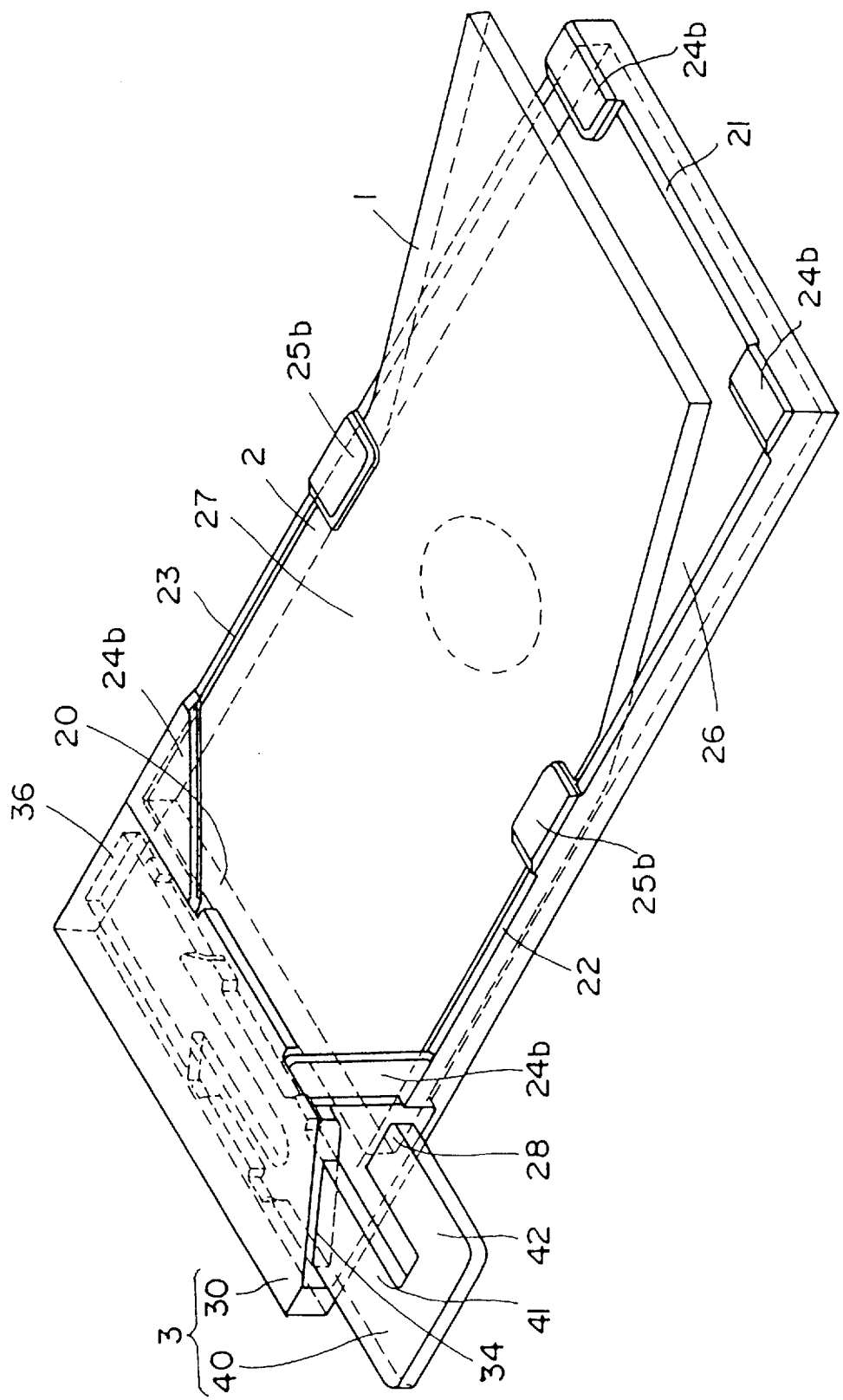
FIG. 10 is a perspective view of the third embodiment of the device of the present invention applied to storing a small size (2.8") CD case, showing the state wherein the CD case is being inserted in a hard case.
Figure 11:
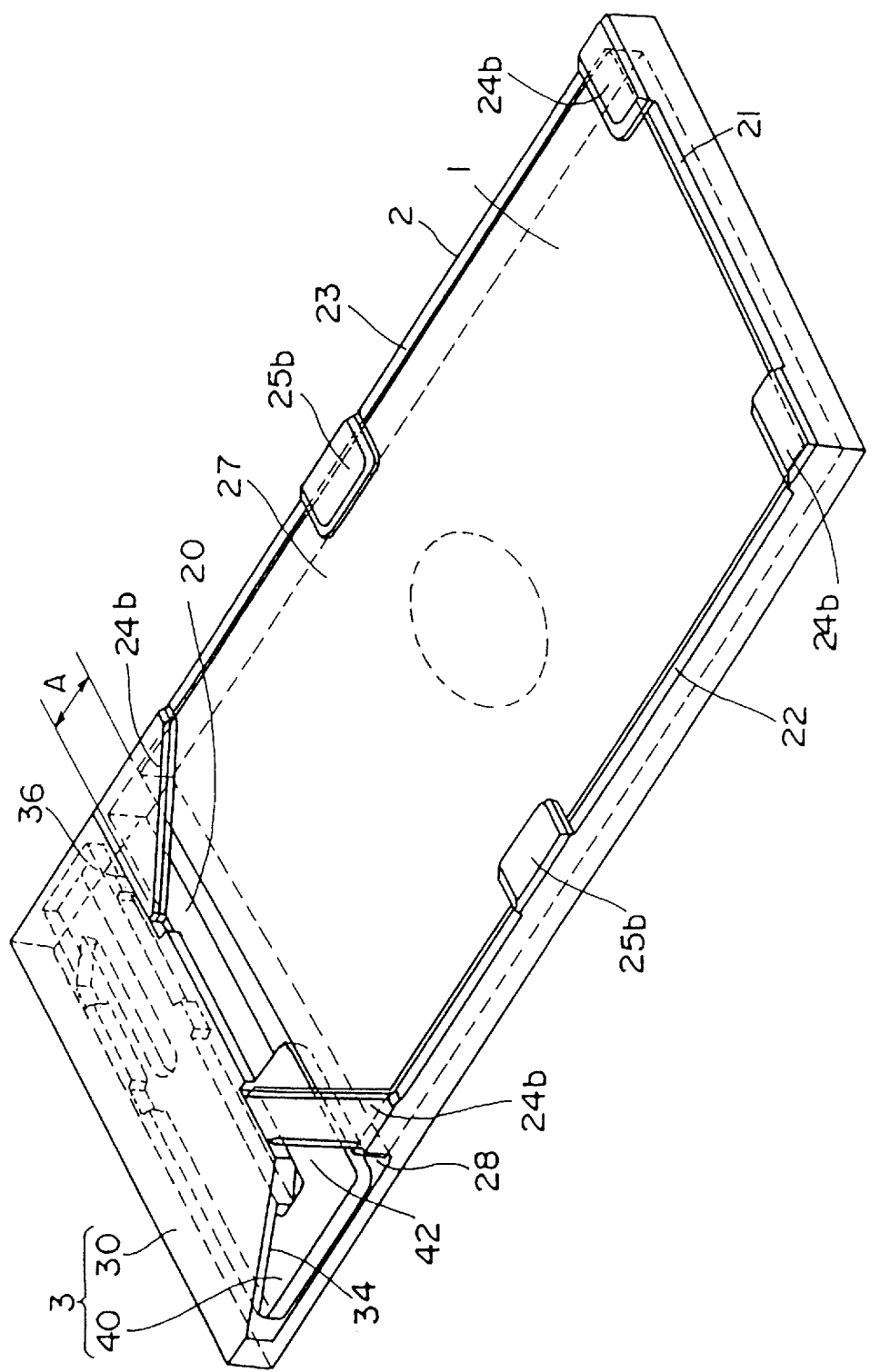
FIG. 11 is a perspective view of the same device as shown in FIG. 10, showing that the device is in a locked state.

The hard cases 2 of this third embodiment and the above-mentioned first and second embodiments can be applied to CD cases for small size CDs. FIGS. 10 and 11 show examples where this third embodiment is applied to a CD case for small size CDs.

In this instance, the hard case 2 has, in addition to, eaves of upper surface corner protection walls 24b formed at four corners, upper surface protection walls 25b on both sides near the center of the longitudinal side. The opening 27 for insertion and removal of CD case is formed to be surrounded by the upper surface protection walls 24b at four corners and the upper surface protection walls 25b near the center, and has a plane area smaller than the plane area of a small size CD.

When inserting from the opening 27 for insertion and removal of CD case, a small size CD case should be slightly bent as shown in FIG. 10. After insertion, the case is locked according to the same procedure mentioned above as shown in FIG. 11.

[Fourth embodiment]

Figure 12:
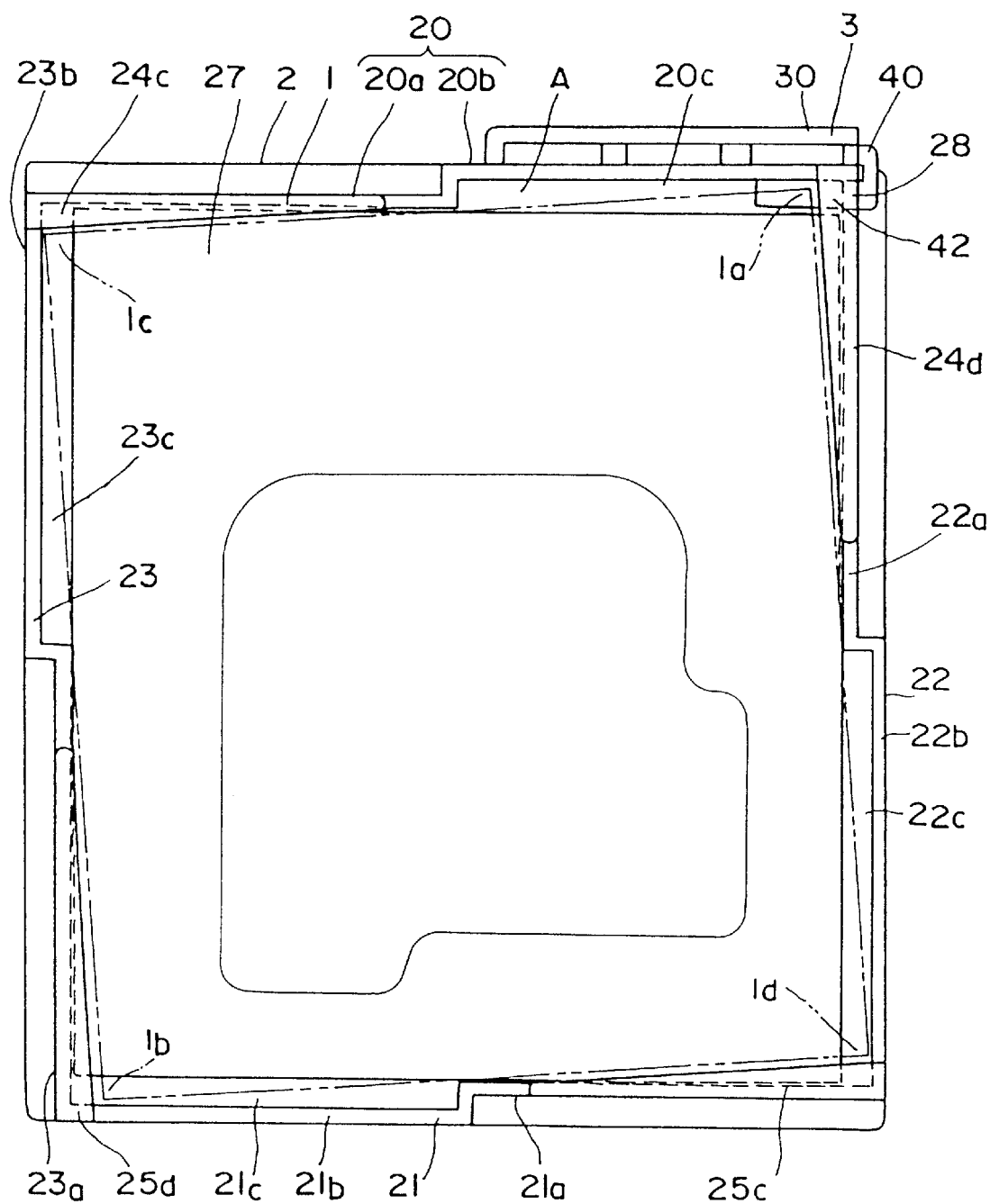
FIG. 12 is a plan view of a fourth embodiment of the device of the present invention, showing the state wherein a CD case has been housed in a hard case.

FIG. 12 is a fourth embodiment of the present invention and shows a plan view of a device wherein a CD case is housed in a hard case.

The hard case 2 in this embodiment is also a parallelepiped having two pairs of side frames 20, 21, and 22, 23, and upper and lower frames. The parallelepiped is configured to provide a sufficient space for the CD case to move therein to the rotating direction. Provided on at least one pair of side frames 20, 21 is a step which consists of first walls 20a, 21a defining the area for housing CD case 1 when the CD case 1 is rotated and a second walls 20b, 21b projecting outwardly from the first walls 20a, 21a. The pair of side frames 20, 21 have the same shape and the first walls 20a, 21a and the second walls 20b, 21b are diagonally positioned.

An opening 27 for insertion and removal of CD case is formed on the same plane as the hard case 2 slightly inclined from the rectangle of the hard case 2, but with an area larger than that of the CD case 1, wherein one pair of diagonal positions 1a and 1b for CD case 1 is invading into concave parts 20c and 21c formed by the second wall 20b, 21b, respectively of side frames 20, 21, while the other pair of diagonal positions 1c and 1d for CD case 1 is not covered by eaves of upper surface protection walls 24c, 25c provided along the first walls 20a, 21a.

With regard to the other pair of side frames 22, 23, if these are made in the same shape as the side frames 20, 21, first walls 22a, 23a, second wall 22b, 23b, and convex parts 22c, 23c are formed on the side frames 22, 23, and upper protection walls 24d, 25d are formed along the first wall 22a, 23a. Accordingly, said two pairs of side frames 20, 21 and 22, 23 are almost symmetrical with respect to the upper surface center of the hard case 2. In this manner, as shown in FIGS. 12 and 13, the opening 27 for insertion and removal of a CD case is formed on the same plane as the square upper surface of the hard case 2 but obliquely from the rectangle so that the opening allows the CD case 1 to be inserted or removed.

A lock mechanism 3 is integrally formed on the side frame 20. Furthermore, formed on one end of the side frame 22 where the lock mechanism is linked is a gap bar insertion opening 28 for insertion and removal of the gap bar 42 for a lock key 40.

Accordingly, when the CD case 1 is to be inserted into the hard case 2, the lock mechanism is brought into a complete release state and the CD case 1 is allowed to drop down to the hard case from above the opening 27 for insertion and removal of CD case. The CD case 1 is then rotated clockwise to bring the respective corners 1a, 1b, 1c, 1d of the CD case 1 to contact with inner walls of the first walls 20a, 21a, 22a, and 23a, thereby forming a gap A between the inner wall of the second wall 20b for the side frame 20 and the corner 1a for the CD case 1. Lock is effected by causing the gap bar 42 of the lock mechanism 3 to present in this gap.

Figure 13:
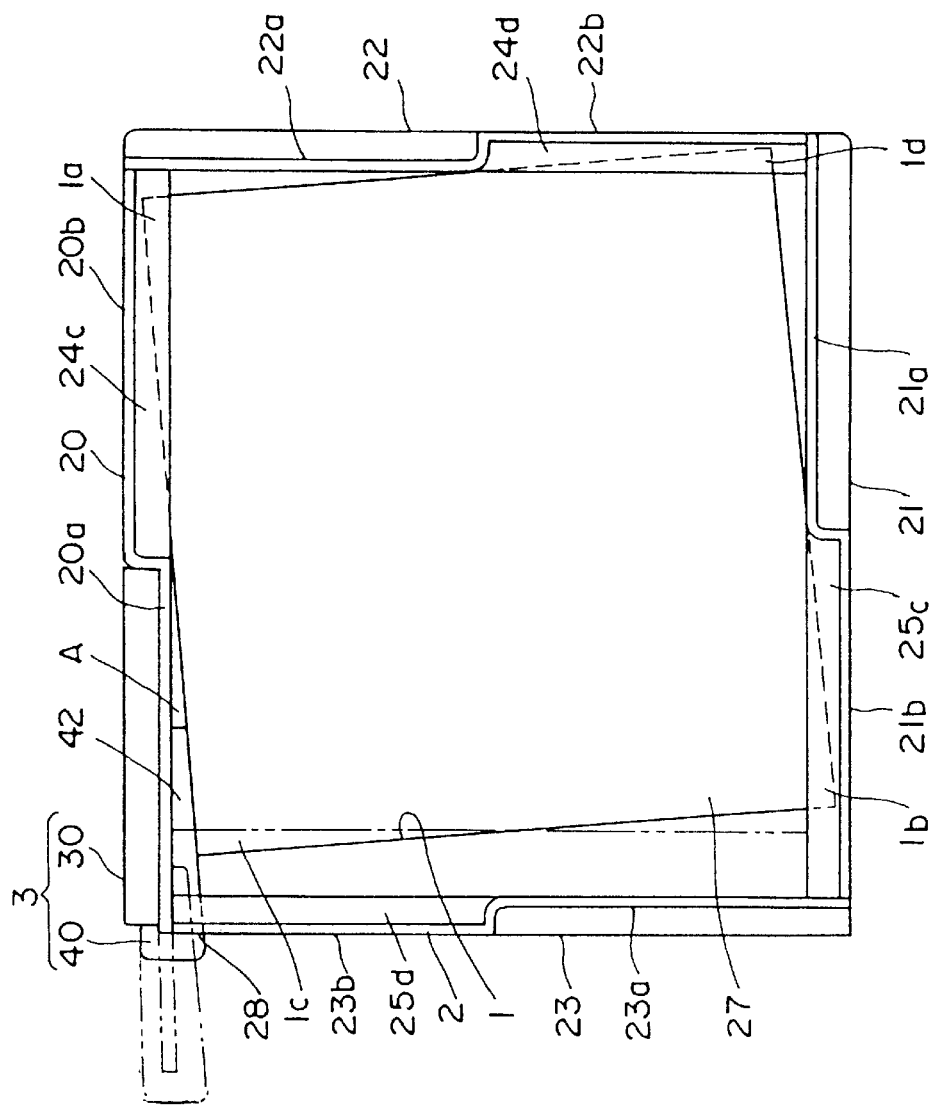
FIG. 13 is a modified storage and safety device of the fourth embodiment, showing a plan view of the state wherein a CD case has been housed in a hard case.

FIG. 13 is a plan view of a modified storage and safety device of the fourth embodiment.

The difference between this storage and safety device in FIG. 13 and that shown in FIG. 12 is that this device has eaves of upper surface protection walls 24c, 25c, 24d, 25d formed along the upper part of the second walls 20b, 21b, 22b, 23b of the side frames 20, 21, 22, 23, and that the opening 27 for insertion and removal of CD case is formed on the same plane as the upper square surface of the hard case 2 and with an area larger than that of the CD case 1.

Accordingly, when the CD case 1 is inserted, the CD case 1 is allowed to drop down to the hard case 2 from the opening 27 for insertion and removal of CD case. The CD case 1 is then rotated counter-clockwise to bring the respective corners 1a, 1b, 1c, 1d of the CD case 1 to contact with the second walls 20b, 21b, 22b, and 23b, thereby forming a wedge-shaped gap A for insertion and removal of the lock mechanism 3 between the first wall 20a and the corner 1c for the CD case 1. Lock is effected by causing the gap bar 42 of the lock mechanism 3 to be present in this gap.

Figure 14:
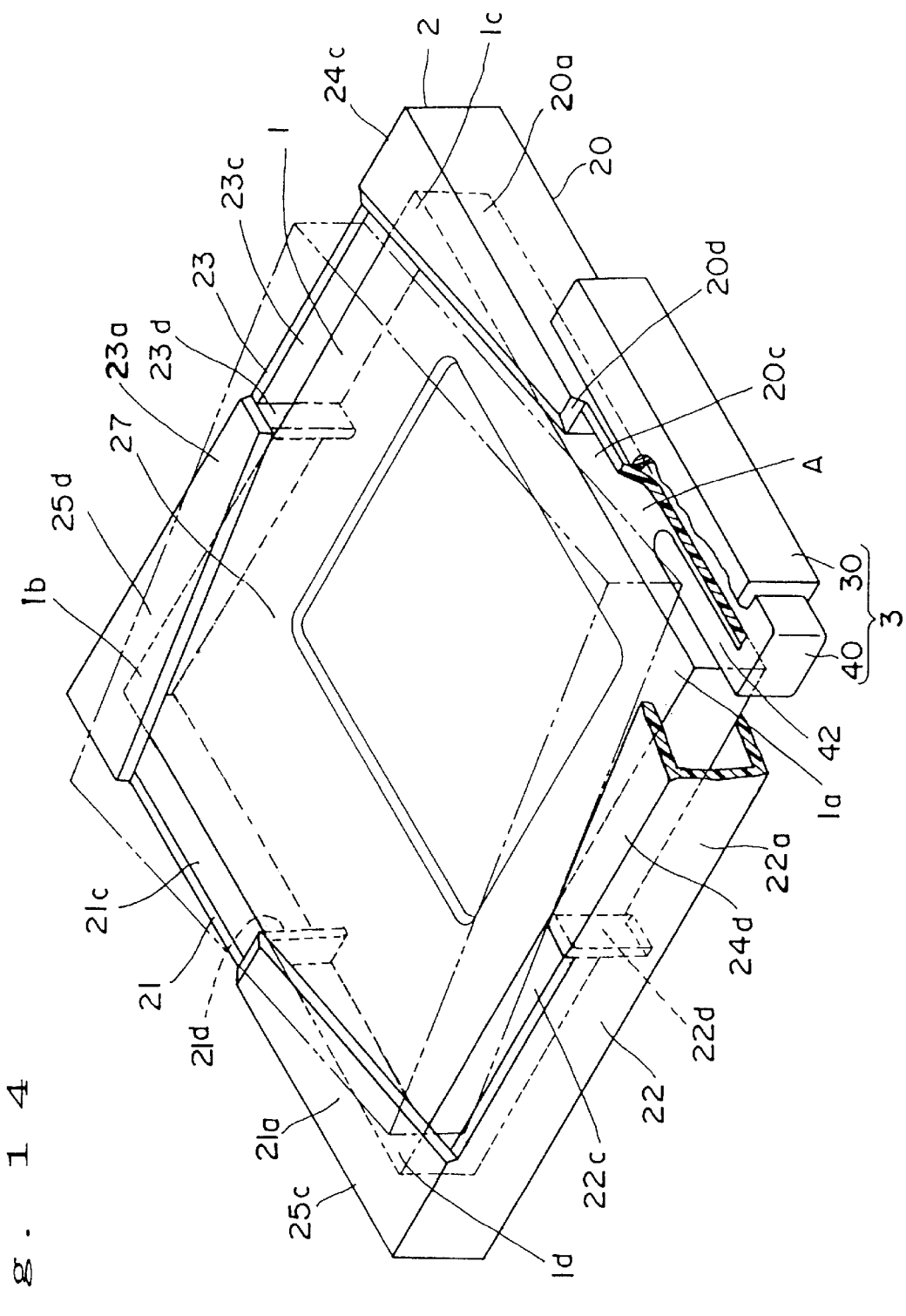
FIG. 14 is a perspective view of another modified storage and safety device of the fourth embodiment.

FIG. 14 is a perspective view of a modified storage and safety device of the fourth embodiment.

The difference between this storage and safety device in FIG. 14 and that shown in FIG. 12 is that this device has vertical projections 20d, 21d, 22d, 23d around the center of the side frames 20, 21, 22, 23, and that eaves of upper surface protection walls 24c, 25c, 24d, 25d are formed along the upper part of the side walls 20a, 21a, 22a, 23a adjacent to these vertical projections 20d, 21d, 22d, 23d.

An opening 27 for insertion and removal of CD case is formed on the same plane as the hard case 2 inclined from the rectangle of the hard case 2, but with an area larger than that of the CD case 1, wherein each corner 1a, 1b, 1c, 1d of CD case 1 invades into concave parts 20c, 21c, 22c, 23c which are not covered by the upper surface wall formed by the vertical projections 20d, 21d, 22d, 23d for the side frames 20, 21, 22, 23.

Accordingly, when the CD case 1 is inserted, the CD case 1 is allowed to drop down to the hard case 2 from the opening 27 for insertion and removal of CD case and rotated counter-clockwise to bring the respective corners 1a, 1b, 1c, 1d of the CD case 1 to come underneath the upper surface protection walls 24c, 25c, 24d, 25d, thereby forming a gap A between the concave 20c and the corner 1a for the CD case 1. Lock is effected by causing the gap bar 42 of the lock mechanism 3 to be present in this gap A.

The storage and safety devices for articles being stored in the third and fourth embodiments allow the label contained in the cassette on which information concerning the disc is written or an ornament is provided to be easily seen, because only a part of CD case such as corners are covered and almost all area on the upper surface is open when the CD case is stored in the hard case.

Although the lock mechanism used in the first embodiment is applicable to the lock mechanism for the storage and safety device of the second to the fourth embodiments, it is needless to mention that a lock mechanism with other construction can also be used.

Therefore, other embodiments of the device in the present invention for modified lock mechanism will be illustrated hereinbelow.

[Fifth embodiment]

Figure 15:
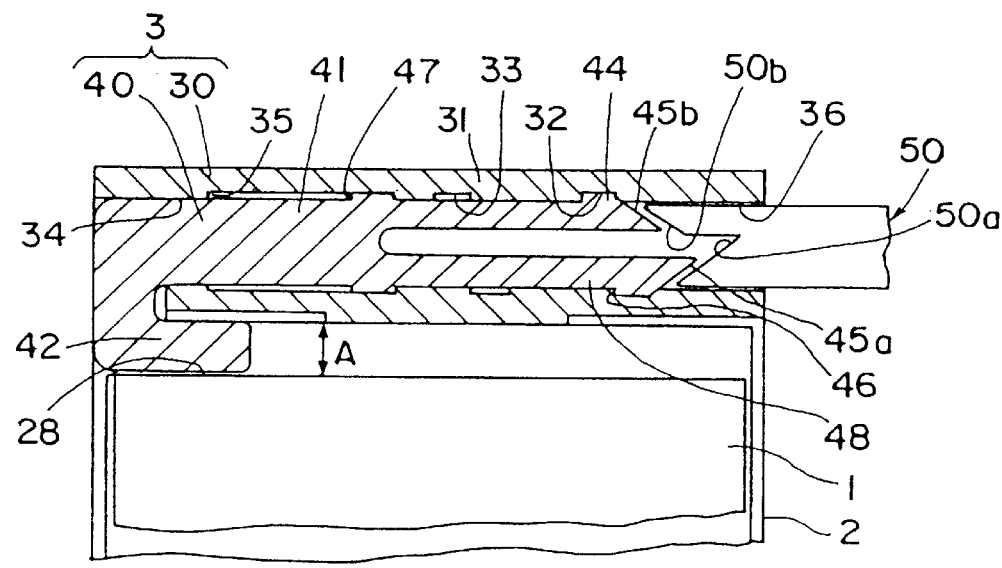
FIG. 15 is a cross-sectional view of the lock mechanism of a fifth embodiment of the present invention, wherein the lock mechanism is in a first stable position of lock.
Figure 16:
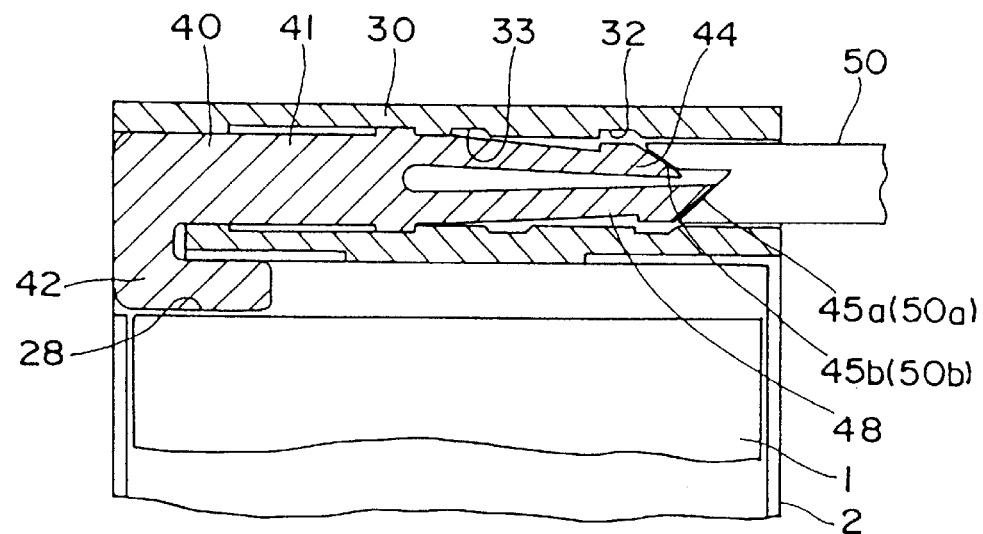
FIG. 16 is a cross-sectional view of the lock mechanism of FIG. 15, wherein the lock mechanism is in an intermediate position of lock release.
Figure 17:
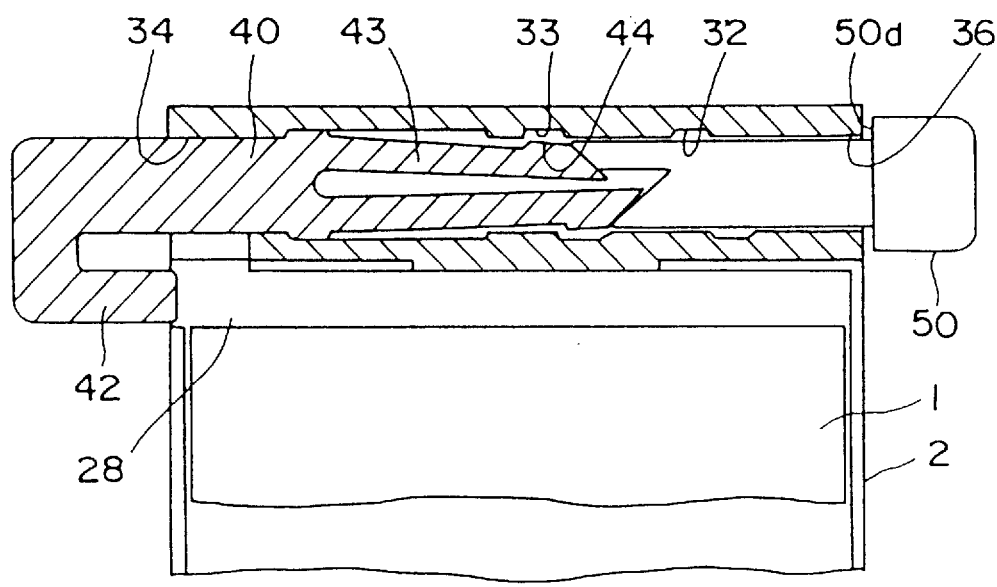
FIG. 17 is a cross-sectional view of the lock mechanism of FIG. 15, wherein the lock mechanism is in a second stable position of complete lock release.
Figure 18:
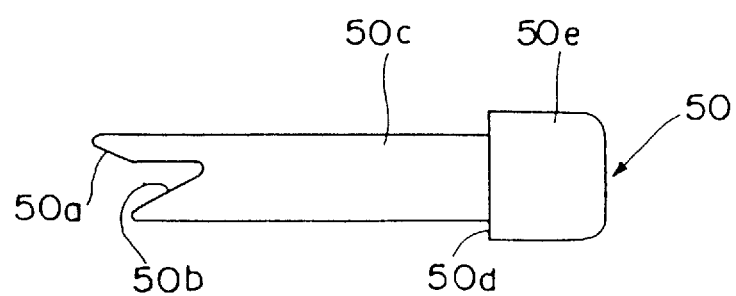
FIG. 18 is a plan view of a release jig of the device shown in FIG. 15.

FIGS. 15–18 show the fifth embodiment of the present invention, in which FIGS. 15–17 are cross-sectional views of the second lock mechanism and FIG. 18 is a plan view of a release jig.

The lock mechanism 3 shown in FIGS. 15, 16 and 17, in a state where the lock key constituting the lock mechanism 3 is incorporated into a lock housing, is attached to a side frame 20 of a hard case 2 for a small size CD case shown, for example, in FIGS. 10 and 11 by a bonding means such as ultrasonic fusion or other adhesive means. Lock key 40 is made of a plastic material, such as an elastic polyacetal resin, by injection molding and has a lock key main body 41, a gap bar 42, and a tuning fork-shaped section 48.

The lock key main body 41 has integrally formed therewith a gap bar 42 with a U-shaped cross-section on one end and a tuning fork-shaped section 48 having two branches with a different length on the other end. Provided at the tip of the tuning fork-shaped section 48 is a key hook with an arrowhead shape which has slopes 45a, 45b for insertion extending outwardly from the inside end of the two branches and a vertical wall 46 for engagement in the escaping direction.

Because the two branches of the tuning fork-shaped section have the length difference from each other, the two slopes 45a, 45b for insertion are not symmetrically positioned in relation to the center line of the tuning fork-shaped section. There is a deviation in the slopes corresponding to the difference in the length of the two branches. In addition, formed on the base of the lock key main body 41 is a loose-out-proof step 47 which prevents the lock key from being drawn out when lock is released.

The lock housing 30 is made of a plastic material such as polycarbonate, the same material for manufacturing the hard case 2, by injection molding. It is desirable that the plastic material is colored for preventing the internal lock mechanism from being easily seen from outside. Formed in this lock housing 30 are a rectangular housing part 31 for insertion of the lock key main body 41 and two concave parts 32 and 33, respectively for lock and release, which are provided on the inner wall of the housing 31 facing the key hook 44 of the lock key main body.

Provided furthermore in the lock housing 30 are an opening 34 for inserting the lock key main body 41 and, vis-a-vis facing this opening 34, an entrance 36 for insertion of releasing jig which functions to release lock.

As shown in FIG. 18, the releasing jig 50 used for releasing lock consists of a plate section 50c which is to be inserted into the housing 31 and a head section 50e which has a stopper section 50d. In addition, formed at the tip of the plate section 50c are pressing slopes 50a, 50b shaped complementary to the slopes 45a, 45b for insertion of a key hook 44 with an arrowhead shape formed at the end of tuning fork-shaped section 48 of the lock key main body 41.

The lock key main body 41 can take a first stable position, i.e. a locked position (FIG. 15), wherein the key hook 44 engages the concave part 32 for locking within the housing part 31, and a second stable position, i.e. a complete released position (FIG. 17), wherein the key hook 44 engages the concave part 33 for release.

For the lock mechanism 3 having this construction, when the lock key 40 is pushed forward until it stops, the gap bar 42 enters into the gap A between the small-size CD case 1 and the side frame 20, thereby making it impossible for the small-size CD case 1 to move. At the same time, the tuning fork-shaped section 48 of the lock key main body 41 is smoothly inserted into the housing part 31 guided by the slopes 45a, 45b of the arrow-head shaped key hook 48, while being inwardly bent due to its springing force, whereby the two key hooks 44 are locked in the concave part 32 for locking of the housing part 31. As a result, the lock mechanism 3 is brought into the locked state at the first stable position.

Under this conditions, the small-size CD case cannot move in the hard case 2 due to the gap bar 42. In addition, because the up-and-down movement of the CD case 1 is prohibited by the upper protection wall 24b, 25b and the lower protection wall 25, the CD case 1 cannot be taken out from the opening 27 for insertion and removal of CD case.

Lock release can be implemented by pushing and inserting the release jig 50 from the releasing jig insertion entrance 36 of the lock housing 30 as shown in FIGS. 15 and 17. Only when the pressing slopes 50a, 50b at the tip of release jig 50 meet the slopes 45a, 45b for insertion of a key hook 44 with an arrowhead shape for the lock key main body 41, the two branches of tuning fork-shaped section 48 for the lock key main body 41 can uniformly bend inwardly against the spring force of the tuning fork-shaped section as shown in FIG. 16, whereby the two key hooks 44 are simultaneously released from the concave part for release 32. With this operation the lock key main body 41 goes back and pushed out from the gap bar 42 from the gap bar insertion opening 28 as shown in FIG. 17.

Thus, when the release jig 50 is pushed forward until the stopper 50d comes in contact with the side of the entrance 36 for insertion of releasing jig for the lock housing 30, the key hook 44 takes a position conforming to the concave part for release 33 of lock housing 30, whereby the small-size CD case 1 is brought to a state where it can move within the hard case 2, i.e. the complete release state. In this manner, a series of operation from lock release of the key hook 44 and pushing of gap bar 42 can be implemented simultaneously by a continuous action of pushing the release jig 50.

The two key hooks 44 with an arrowhead shape for the lock key main body 41 cannot be unlocked only by pushing either one of the slopes for insertion 45a or 45b. The lock is released only when both of these are simultaneously pushed. Release of lock is therefore difficult unless the abovementioned exclusive release jig is used. The effect of burglarproof is thus great in this construction.

[Sixth embodiment]

Figure 20:
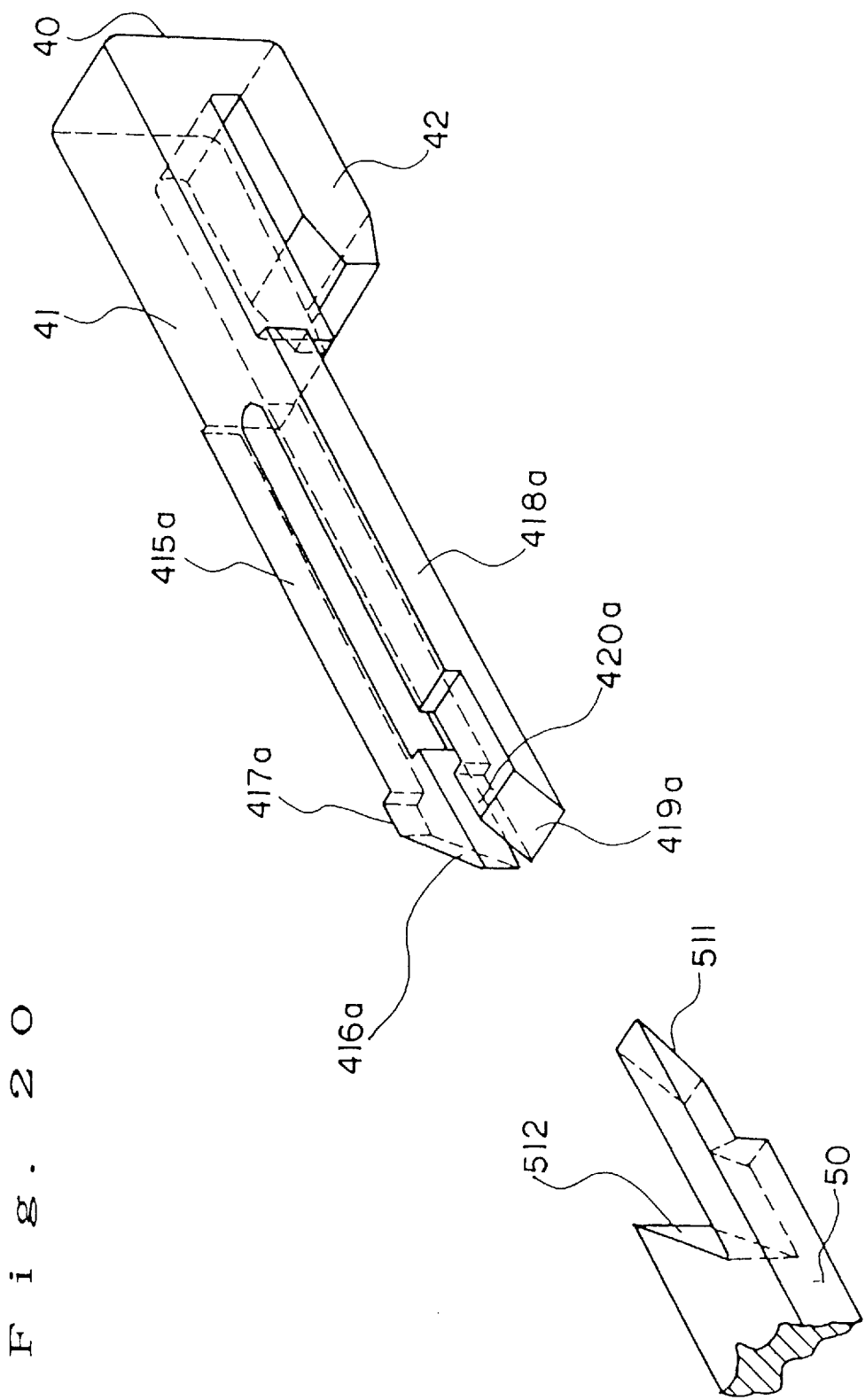
FIG. 20 is a perspective view of the sixth embodiment of the device of the present invention, wherein the lock mechanism is in a locked state.
Figure 21:
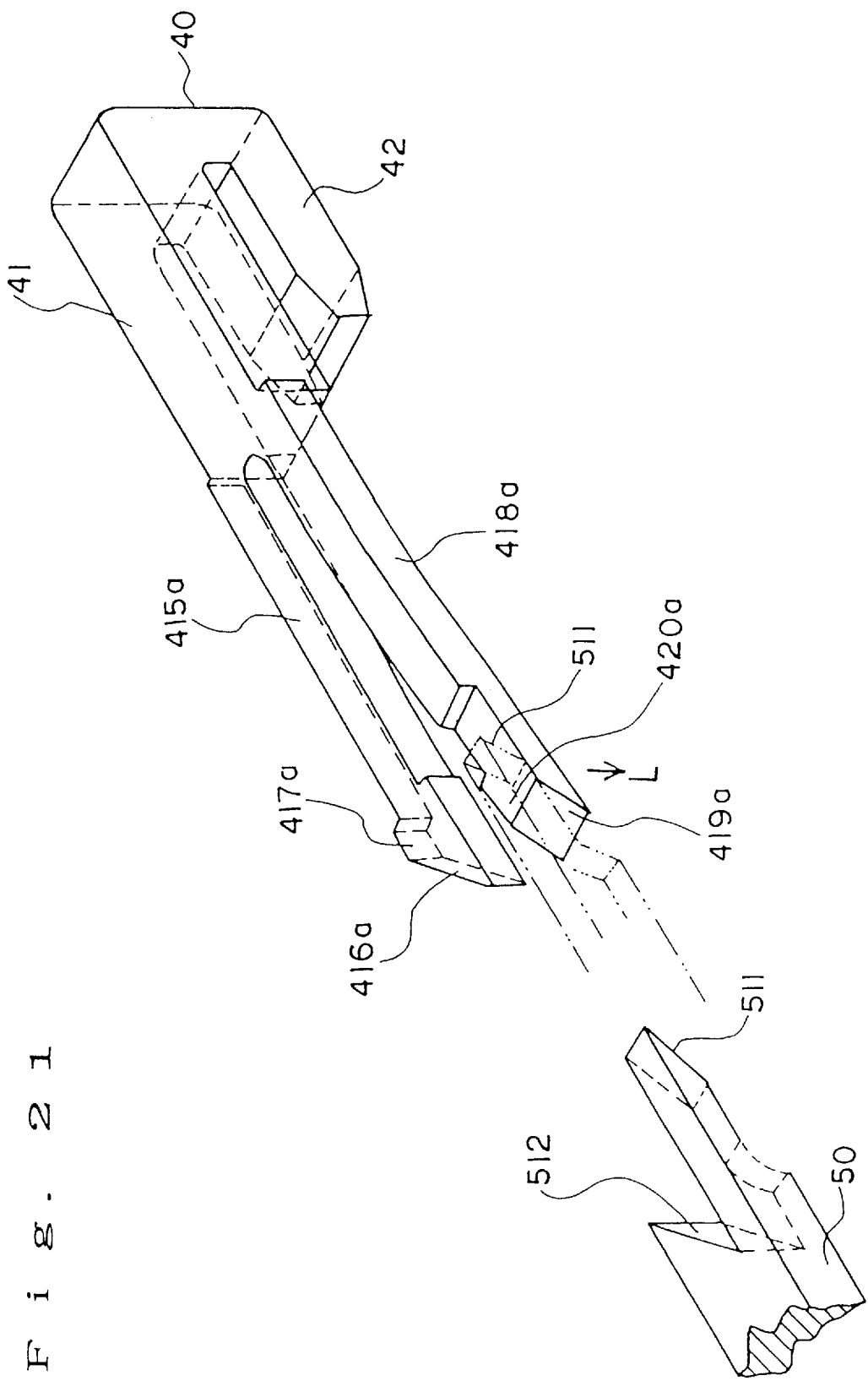
FIG. 21 is a perspective view of the sixth embodiment of the device of the present invention, wherein the stopper section of the lock mechanism is in a released state.
Figure 22:
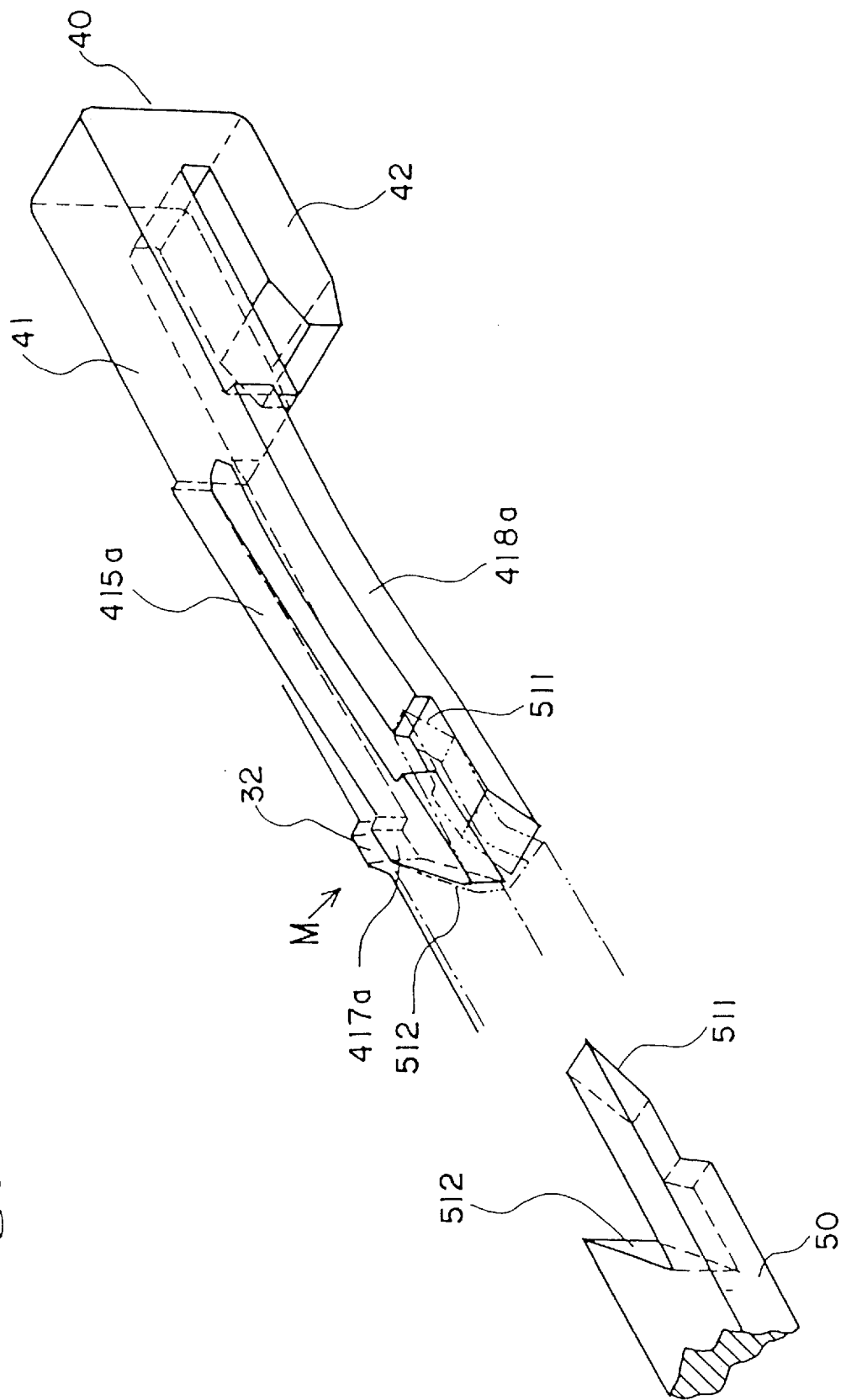
FIG. 22 is a perspective view of the sixth embodiment of the device of the present invention, wherein the key hook of the lock mechanism is in a released state.

FIGS. 19–22 show the sixth embodiment of the device in the present invention, wherein FIGS. 19(a) and 19(b) show a plan sectional view and a side sectional view, respectively, of the lock mechanism; FIG. 20 is a perspective view of the device wherein the lock mechanism is in a locked state; FIG. 21 is a perspective view of the device, wherein the stopper section is in a released state; and FIG. 22 is a perspective view of the device, wherein the key hook is in a released state.

The lock mechanism 3 shown in FIGS. 19–22, in a state where the lock key constituting the lock mechanism 3 is incorporated into a lock housing, is attached to a side frame 20 of a hard case 2 for a small size CD case shown, for example, in FIGS. 8 and 9 by a bonding means such as ultrasonic fusion or other adhesive means. Lock key 40 is made of a plastic material such as an elastic polyacetal resin by injection molding.

The lock key main body 41 has the above-mentioned gap bar 42 with a U-shaped cross-section on one end and a spring section having two parallel branches on the other end. Before being incorporated into the lock housing 30, the first branch 415a and the second branch 418a are formed such that these are apart from each other toward the end in FIG. 20 so that the branches exhibit a spring action. The first branch 415a has a slope for insertion 416a and the convex key hook 417a at the tip, which engages the concave part for lock 32 provided on the wall of the lock housing 30. The second branch 418a with a slope for the stopper release 419a and the stopper section 420a at the tip functions as a stopper for regulating the movement of said first branch 415a.

The lock housing 30 is made of a plastic material such as polycarbonate, the same material used for manufacturing the hard case 2, by injection molding. It is desirable that the plastic material is colored for preventing the internal lock mechanism from being easily seen from outside. Formed in this lock housing 30 are the rectangular housing part 31 for insertion of the lock key main body 41 and one concave part for locking 32 on the inner wall of the housing 31 so as to conform to the key hook 417a of the lock key main body. In addition, provided in the lock housing 30 are the opening 34 for inserting the lock key main body 41 and, vis-a-vis facing this opening 34, the releasing jig insertion entrance 36 for the release of said lock key 40.

The release jig 50 for unlocking is a plate member to be inserted into the housing 31, with a first slope 511 formed at the tip corresponding to the slope for a stopper release 419a in the second branch 418a and a second slope 512 formed in the base corresponding to the slope for insertion 416a for releasing the key hook 417a in the first branch 415a.

As shown in FIGS. 19(a) and 20 because the first branch 415a and the second branch 418a of the lock key main body 41 are pushed by the wall of the housing part 31 against the spring force possessed by themselves in the housing part 31 as mentioned above, the key hook 417a engages the concave part for locking 32 in a stable manner, whereby the locked state is maintained.

Using the lock mechanism of this construction, when the lock key 40 is pushed forward until it stops, the gap bar 42 enters into the gap A between the CD case 1 and the side frame 20 as shown in FIG. 9 and FIG. 19(b), thereby making it impossible for the CD case 1 to move. At the same time, the first branch 415a of the lock key main body 41 is smoothly inserted into the housing part 31 guided by the slope for insertion 416a, while being inwardly bent due to its springing capability whereby the one key hook 417a is locked in the concave part for locking 32 of the housing part 31. As a result, the lock mechanism 3 is brought into the locked state in a stable position.

Under this conditions, the CD case 1 cannot move in the hard case 2 due to the gap bar 42. In addition, because the up-and-down movement of the CD case 1 is prevented by the upper corner protection wall 24b at four corners and the lower protection wall 26, the CD case 1 cannot be taken out from the opening for insertion and removal of CD case 27.

Next, as shown in FIGS. 21 and 22, a lock release is implemented by pushing the release jig 50 from an entrance for insertion of releasing jig 36 of lock housing 30. The release jig 50 is designed so that the first slope 511 at the tip of the release jig not only comes into contact with but also rides over the slope for the stopper release 419a of the second branch 418a as shown by the chain line connected by two dots in FIG. 21. By this action, the second branch 418a is bent and allows the stopper section 420a at the tip to escape toward the direction of the cross-section (the direction of the arrow L in FIG. 21), thereby creating a space. In this manner, the key hook 417a is freed and becomes movable. In this state, however, the state of lock is not released because the key hook 417a engages the concave part for locking 32 due to the spring force of the first branch 415a.

If the release jig 50 is further pushed in from this state, the second slope 512 of the step for the release jig 50 comes into contact with the slope for the insertion 416a of the first branch 415a for the lock key main body 41 and advances as shown in the chain line connected by two dots in FIG. 22, thereby causing the key hook 417a of the first branch 415a to move toward the direction of the plane (the direction of the arrow M in FIG. 23), that is, the space created by the escape of the second branch 418a. The key hook 417a is thereby released from the concave part for lock 32.

The release jig 50 is then further pushed forward and goes ahead sliding in the housing 31 to push out the gap bar 42 from the gap bar insertion opening 28. By this operation, the CD case 1 is brought into the state that it can move in the hard case 2, i.e. the complete release state. In this manner, a series of operation from a lock release of the key hook 417a to push-out of the gap bar 42 can be implemented by a single action of forward pushing of the release jig 50.

Even if the slope for insertion 416a of the first branch 415a is pushed, it is impossible to unlock the lock key main body 41 unless the stopper section 420a for the second branch 418a is released. As a result, a special release jig is required and the safety is ensured.

[Seventh embodiment]

Figure 23A:
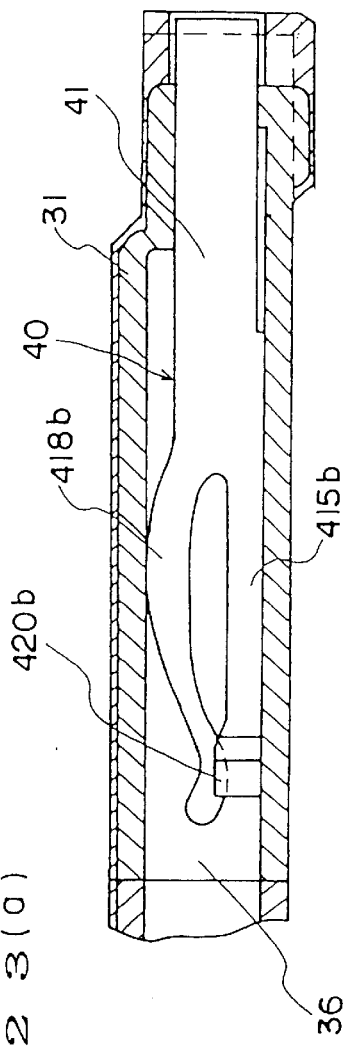
FIGS. 23(a) and 23(b) show a plan sectional view and a side sectional view, respectively, of a seventh embodiment of the device of the present invention, wherein the lock mechanism is in a locked state.
Figure 23B:
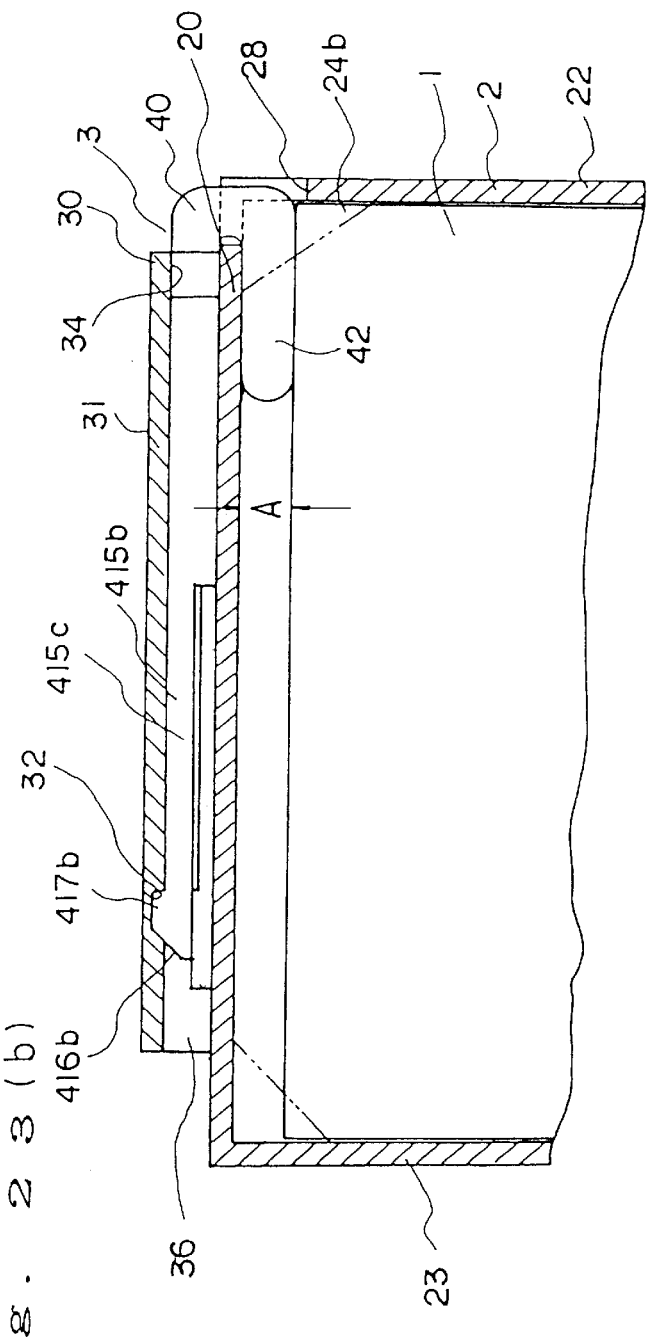
Figure 24:
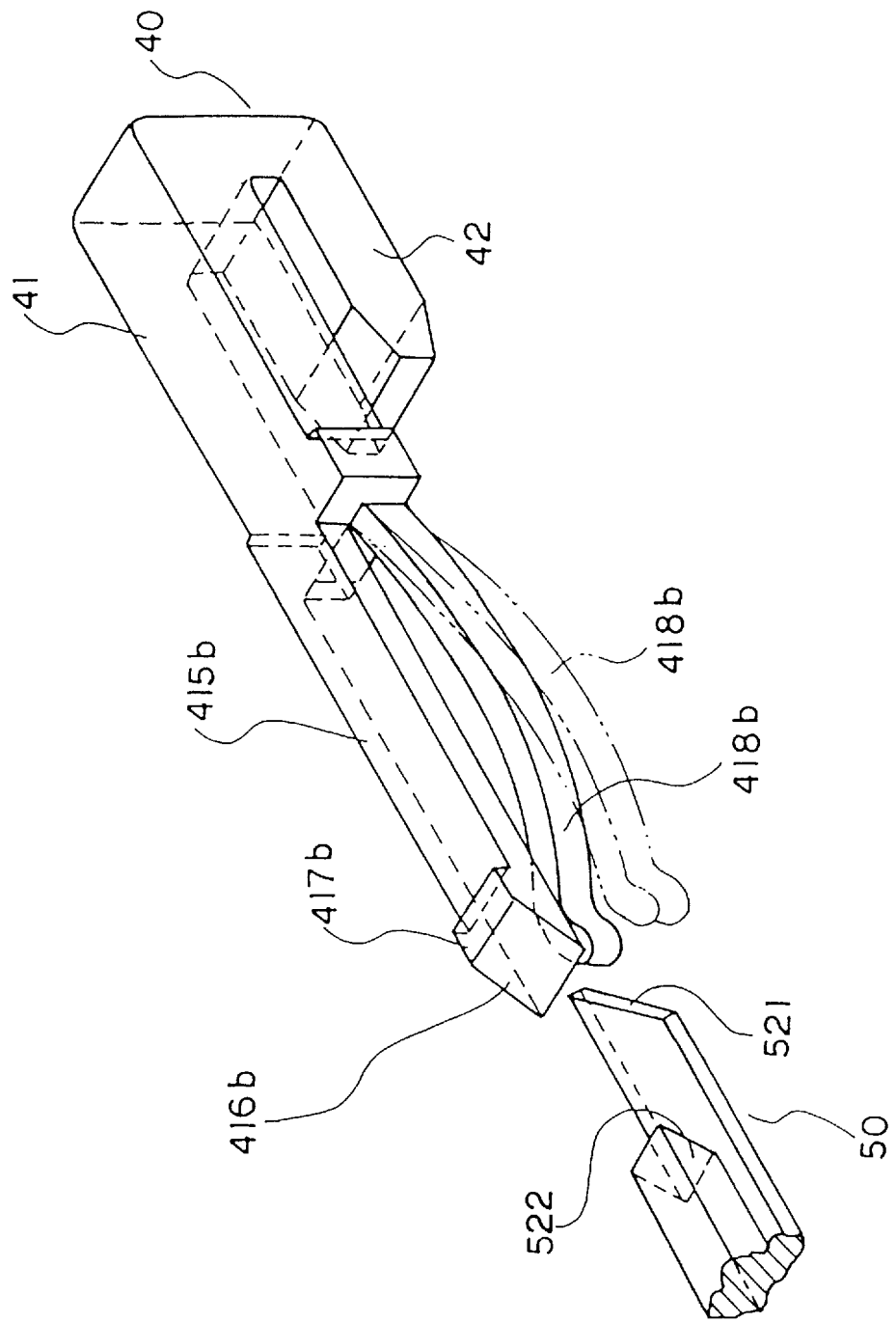
FIG. 24 is a perspective view of the seventh embodiment of the device of the present invention, wherein the lock mechanism is in a locked state.
Figure 25:
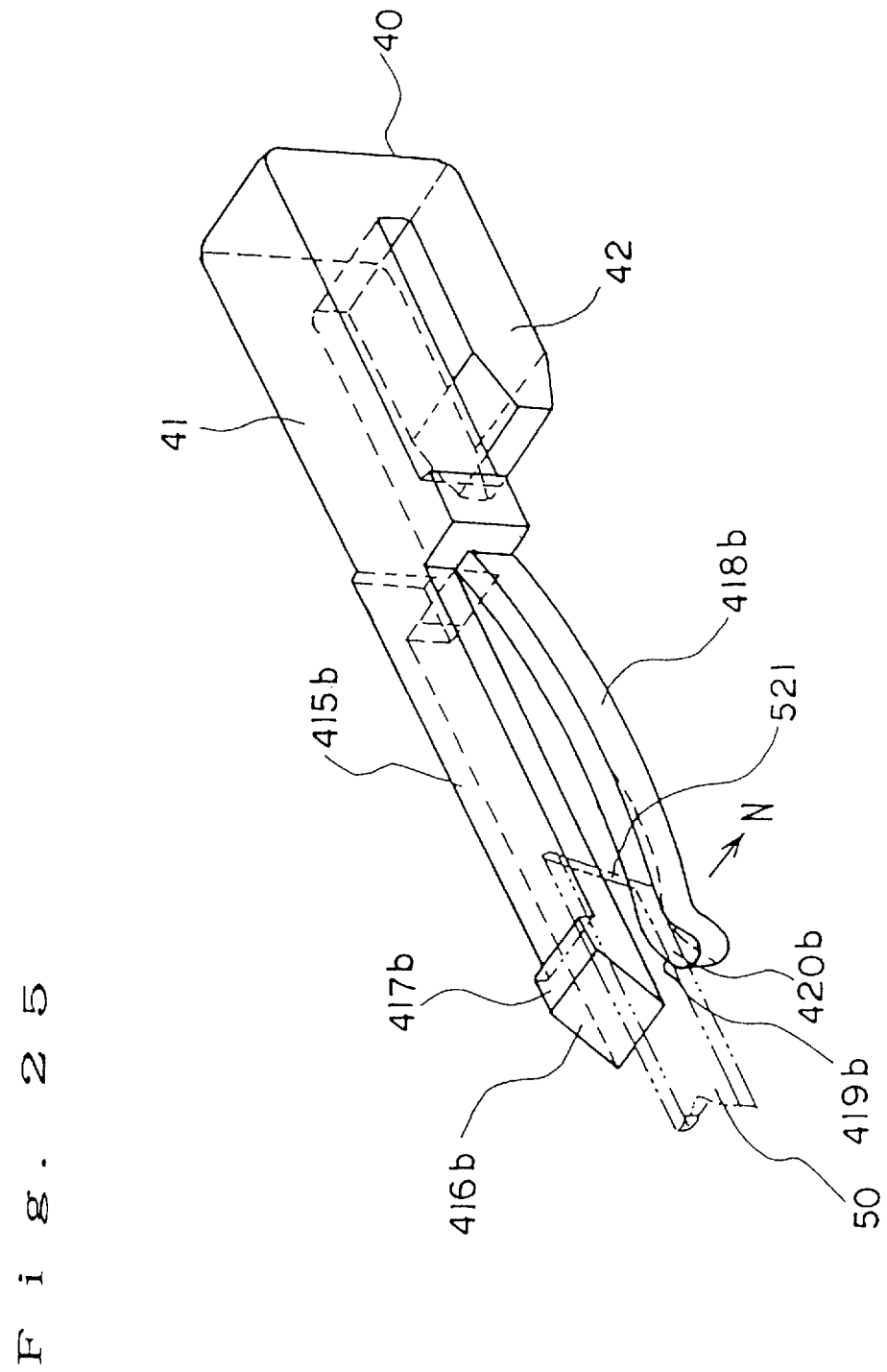
FIG. 25 is a perspective view of the seventh embodiment of the device of the present invention, wherein the stopper section of the lock mechanism is in a released state.
Figure 26:
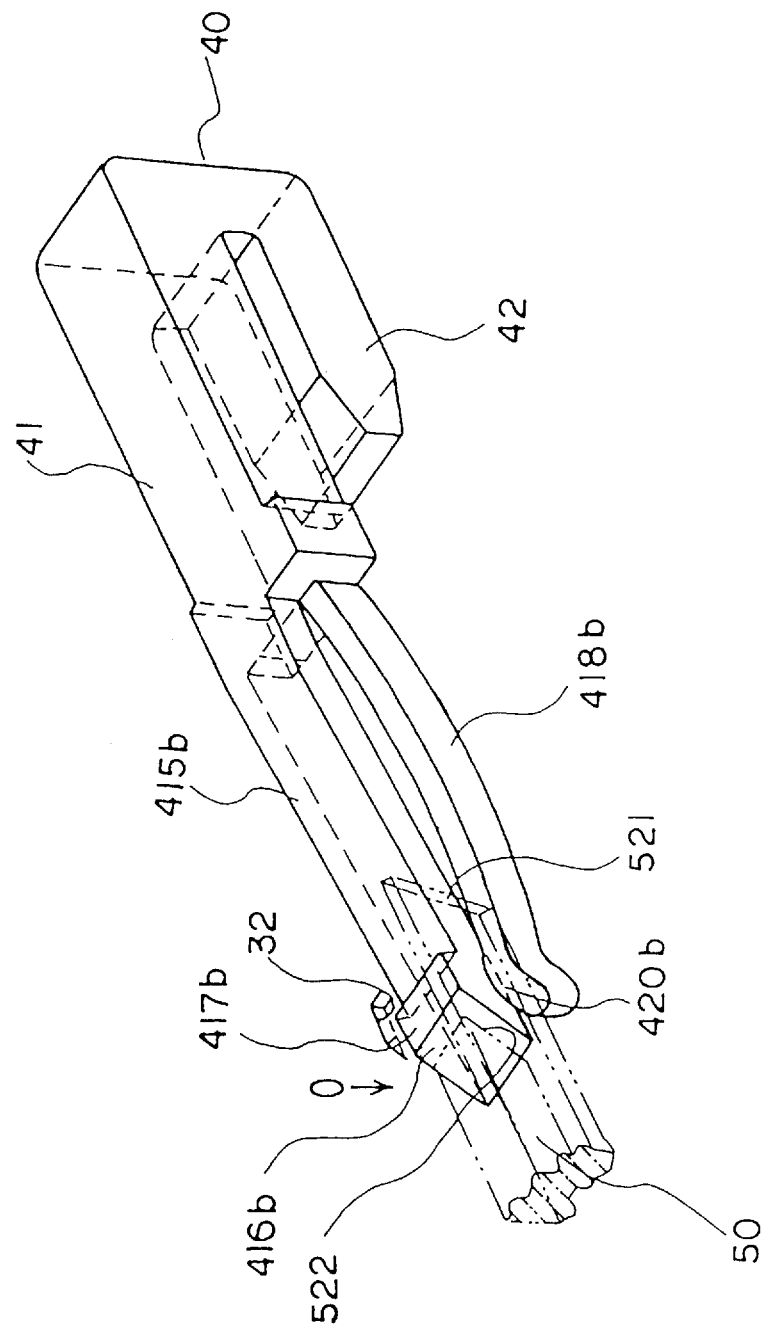
FIG. 26 is a perspective view of the seventh embodiment of the device of the present invention, wherein the key hook of the lock mechanism is in a released state.

FIGS. 23–26 show the seventh embodiment of the device in the present invention, wherein FIGS. 23(a) and 23(b) are a plan sectional view and a side sectional view, respectively, of the lock mechanism; FIG. 24 is a perspective view of the seventh embodiment in a locked state; FIG. 25 is a perspective view in a state where a second branch has been allowed to escape; FIG. 26 is a perspective view in a state, wherein the lock is released by moving the first branch.

The seventh embodiment is different from the sixth embodiment in the relative positions of the lock key main body and the first and second branches, and, as a consequence of this relative position differences, the shape of the release jig is different, with the other features remaining the same. The illustration below is therefore limited to the features of construction differences.

The lock key main body 41 in this seventh embodiment also has a gap bar 42 with a U-shaped cross-section at one end and a spring of two branches arranged parallel in the cross-sectional direction at the other end. Before being incorporated into the lock housing 30, the first branch 415b and the second branch 418b are formed so that these are apart from each other toward the end, as shown by the chain line connected by two dots in FIG. 24, so that the branches exhibit a spring action. The first branch 415b has a slope for insertion 416b and the convex key hook 417b at the tip. The latter engages the concave part for lock 32 provided on the wall of the lock housing 31 as shown in FIG. 23(b), thereby effecting lock.

The second branch 418b has a slope for stopper release 419b and a stopper section 420b at the tip. The stopper section 420b lies underneath the key hook 417b of the first branch 415b, a part of which is overlapping, to function as a stopper for regulating the move of the key hook 417b.

As shown in FIG. 23(b), said lock housing 30 has one concave part for lock 32 corresponding to the key hook 417b of the key lock main body formed on the inner wall of the housing part 31.

The release jig 50 for unlocking is a plane member to be inserted into the housing 31, with a first slope 521 corresponding to the stopper release slope 419b for the second branch 418b formed at the tip and a second slope 522 corresponding to a slope for insertion 416b for unlocking the key hook 417b of said first branch at the bottom.

Release of lock using the lock mechanism with this construction can be implemented as follows. The release jig 50 is first pushed in from the entrance for insertion of releasing jig 36 of lock housing 30. By this action, the first slope 521 at the tip of the release jig 50 comes into contact with the slope for stopper release 419b of the second branch 418b and proceeds by expanding the branch on the slope as shown by the chain line connected by two dots in FIG. 25. As a result, the second branch 418b is bent and allows the stopper section 420b at the tip to escape toward the plane direction (the direction of the arrow N in FIG. 25), thereby creating a space. Accordingly, the key hook 417b is freed and becomes movable. However, the state of lock is not released due to the spring force of the first branch 415b.

If the release jig 50 is further pushed in from this state, the second slope 522 of the step for the release jig 50 comes into contact with the slope for insertion 416b of the first branch 415b for the lock key main body 41 and advances as shown in the chain line connected by two dots in FIG. 26, and causes the key hook 417b of the first branch 415b to be pushed down toward the cross-sectional direction (the direction of the arrow O in FIG. 26), thereby causing it to move to the space created by the escape of the stopper section 420b of the second branch 418b. The key hook 417b is thereby forcibly released from the concave part for lock 32 against the spring force of the first branch 415b.

Accordingly, as shown in the lock mechanism of the sixth embodiment, a series of operation from lock release of the key hook 417b and pushing of the gap bar 42 can be implemented by one continuous pushing action for the release jig 50. In addition, it is impossible to unlock the lock key main body 41 only by pushing the slope for insertion 416b of the first branch 415b unless the stopper section 420b for the second branch 418b is released.

[Eighth embodiment]

Figure 27A:
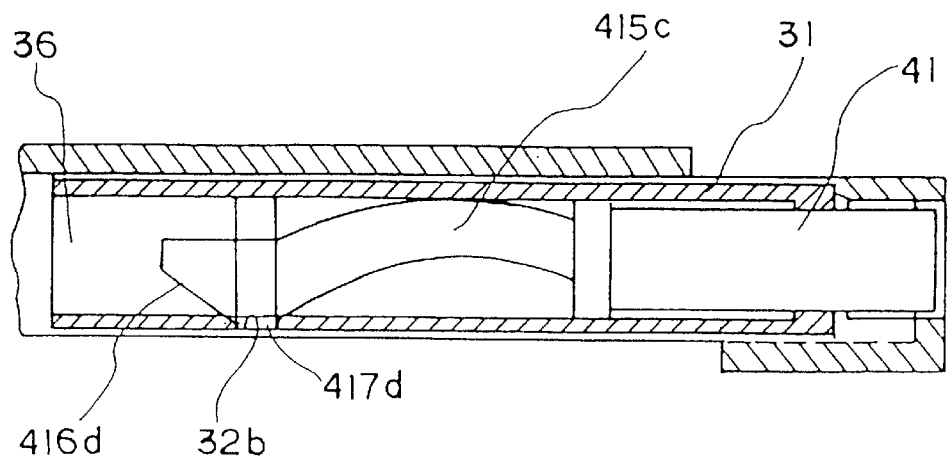
FIGS. 27(a) and 27(b) show a plan sectional view and a side sectional view, respectively, of an eighth embodiment of the device of the present invention, wherein the lock mechanism is in a locked state.
Figure 27B:
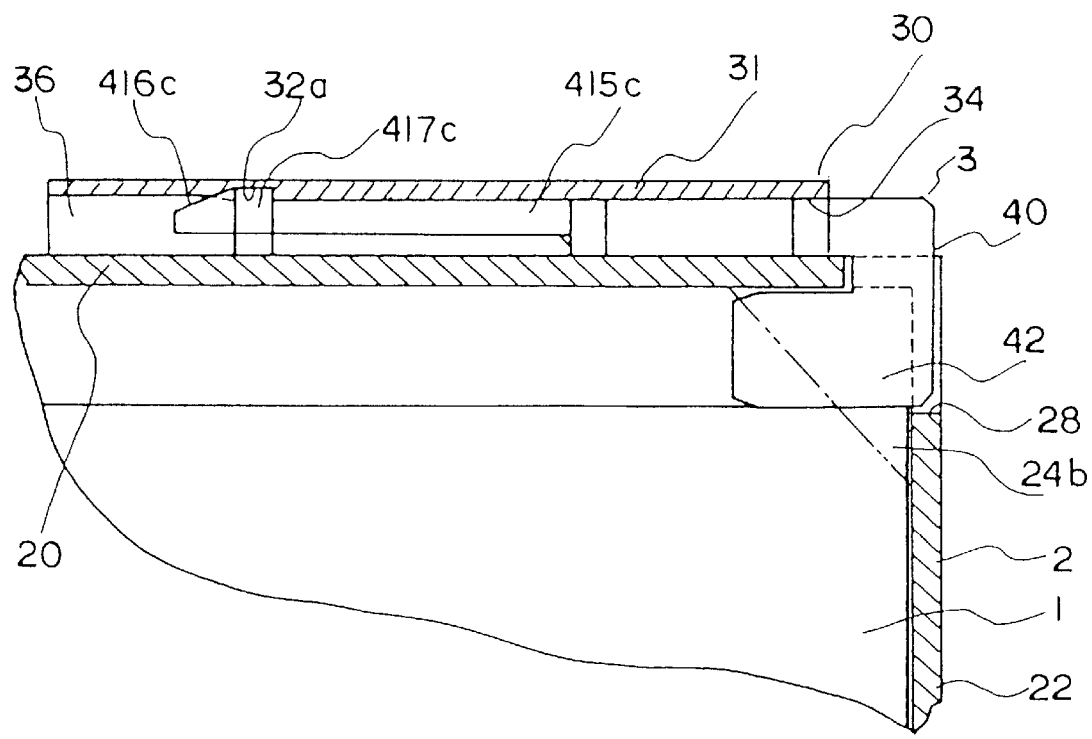
Figure 28:
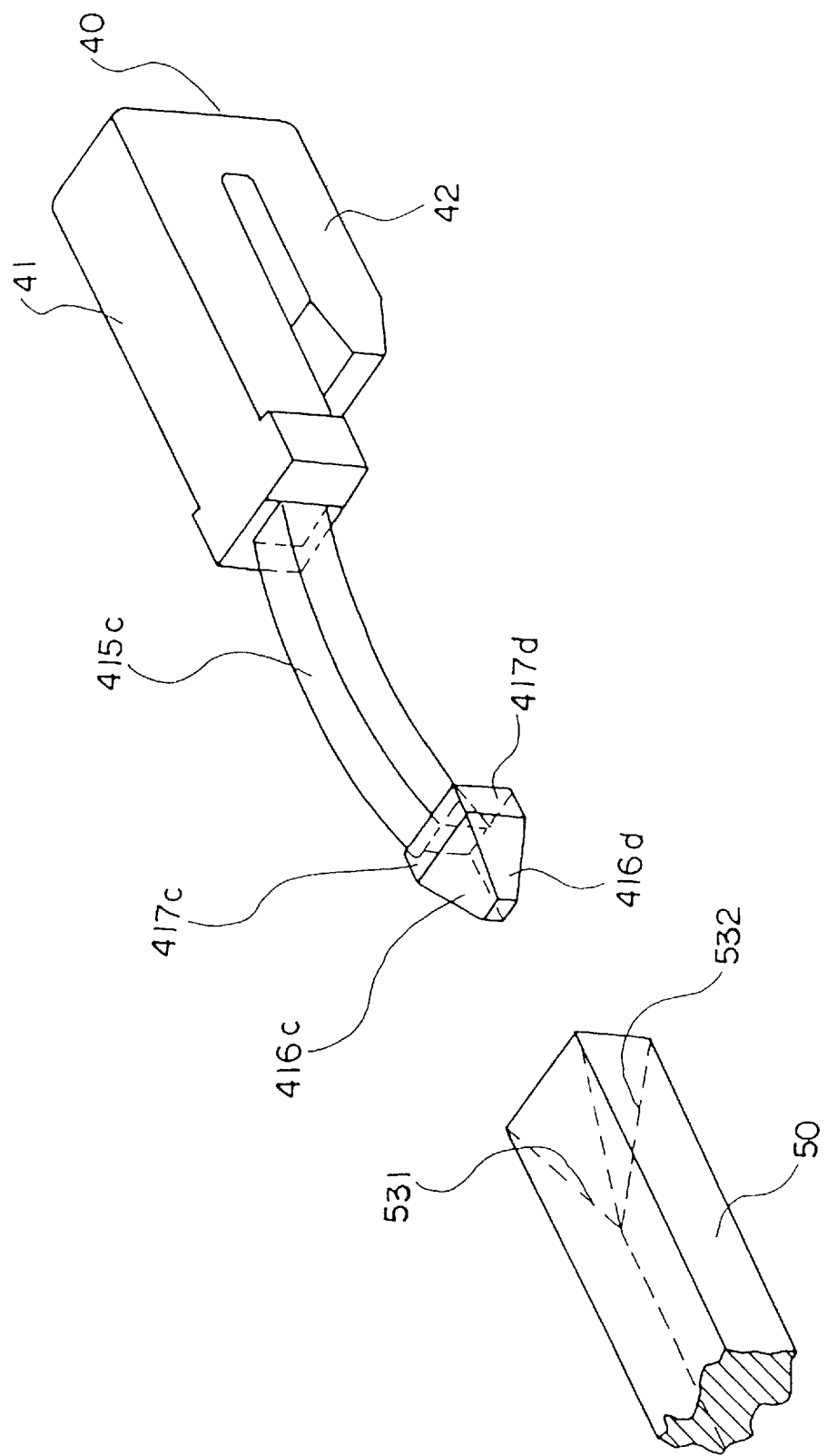
FIG. 28 is a perspective view of the eighth embodiment of the device of the present invention, wherein the lock mechanism is in a locked state.
Figure 29:
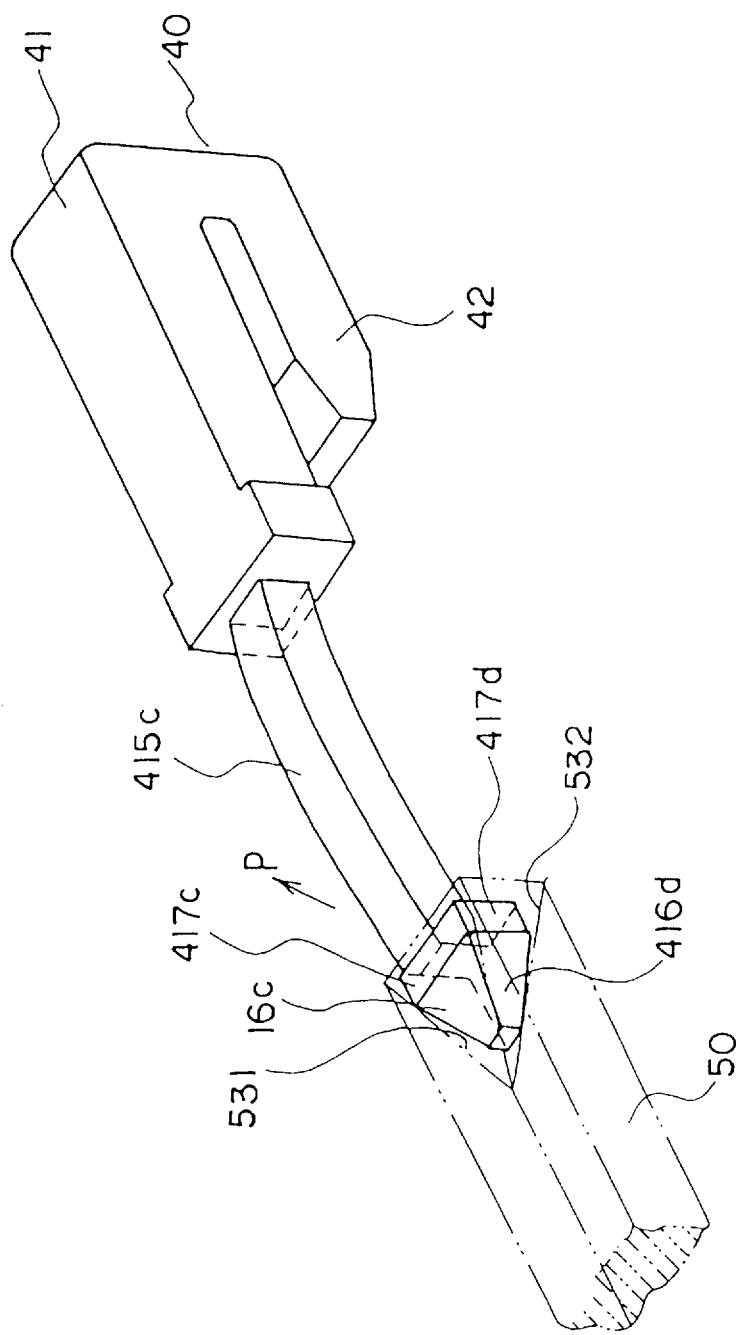
FIG. 29 is a perspective view of the eighth embodiment of the device of the present invention, wherein the two key hooks of the lock mechanism is in a released state.

FIGS. 27(a)–29 show the eighth embodiment of the device of the present invention, wherein FIGS. 27(a) and 27(b) are a plan sectional view and a side sectional view, respectively, of the lock mechanism; FIG. 28 is a perspective view in a locked state; FIG. 29 is a perspective view of a state wherein the spring-shaped section for the lock key is deformed to unlock. This eighth embodiment is the same as the above-described sixth and seventh embodiments except that two key hooks are formed at one spring-shaped tip of the lock key.

The lock key main body 41 for this eighth embodiment also has a gap bar 42 with a U-shaped cross-section at one end and a lock arm 415c with a bow-shaped spring section at the other end. Two slopes for insertion 416c and 416d crossing at right angle and convex key hooks 417c and 417d are formed at the tip of the lock arm 415c, which engage two concave parts for lock 32a and 32b provided on the wall of the housing part 31 crossing at right angle. Each member mutually regulates the movement of the other member.

As shown in FIGS. 27(a) and 27(b), in the housing part 31, the lock key main body 41 takes the state that it is pushed forward by the wall of the housing part 31 against the spring force from the state that the lock arm 415c is free. Accordingly, the first and second key hooks 417c and 417d crossing right angle concurrently engage respectively the two, first and second, concave parts for lock 32a and 32b crossing at right angle which are provided in the housing part 31, whereby lock is maintained in a stable manner.

Release of lock using the lock by mechanism with this construction can be implemented as follows. The release jig 50 is first pushed in from the entrance for insertion of releasing jig 36 of lock housing 30. By this action, the first slope 531 at the tip of the release jig 50 comes into contact with the first slope for insertion 416c of the lock key main body and, at the same time, the second slope 532 is contacted and pressed by the second slope 532. A force for deformation at a magnitude of the synthesized momentum is diagonally conferred. As a result, the lock arm 415c is bent toward the direction of the arrow P in FIG. 29, thereby causing the two convex key hooks 417c and 417d to be respectively released simultaneously from the two concave parts 32a and 32b to effect release of lock.

By this action, the gap bar is released from the gap A, enabling it to move inside the CD case 1 and the hard case 2.

Thus, in the lock mechanism of this embodiment, it is also impossible to unlock the lock key main body 41 unless the two key hooks 417c and 417d formed in the lock arm 415c are simultaneously released. A special release jig which ensures safety, is therefore necessary.

[Ninth embodiment]

Figure 30:
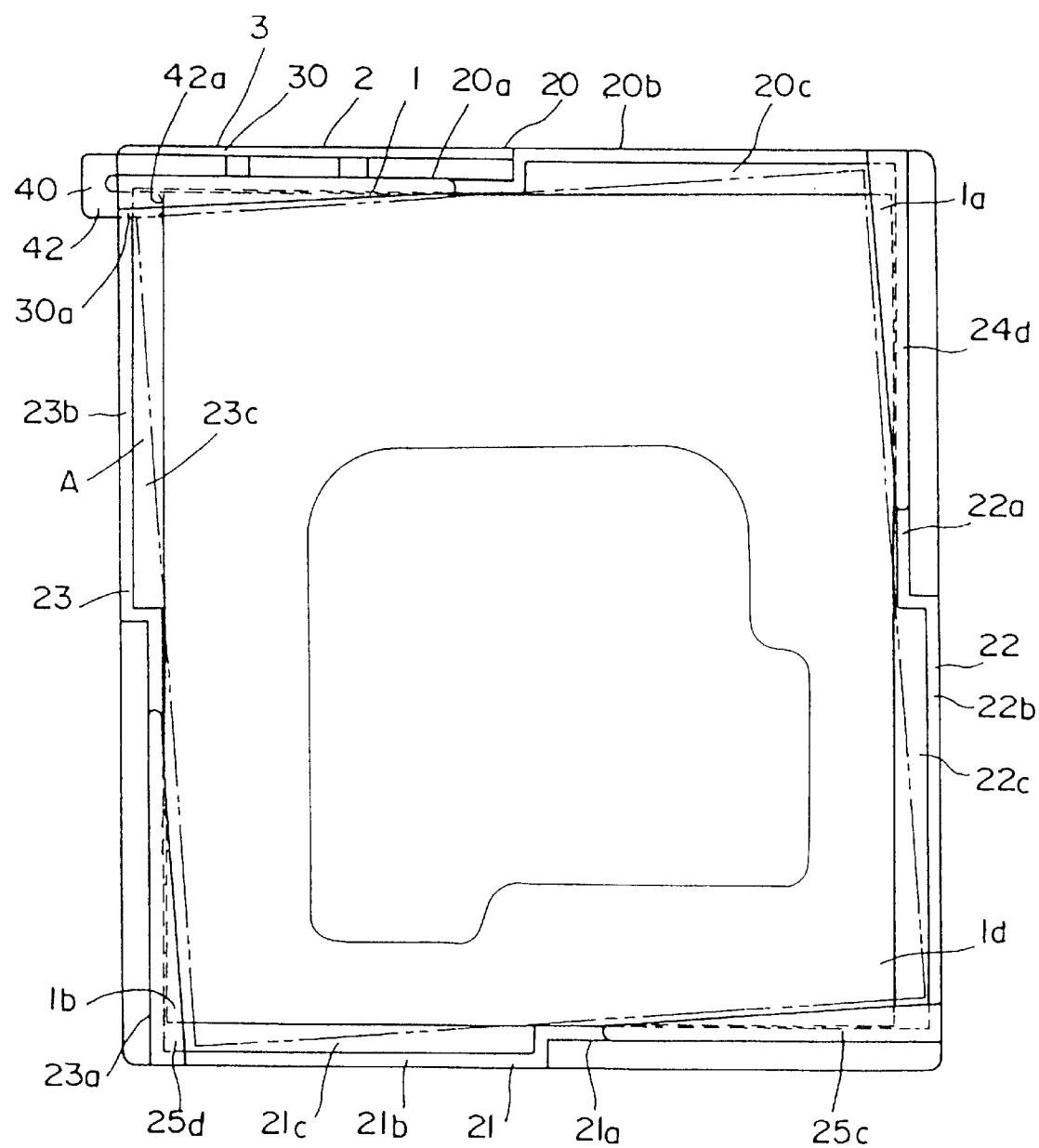
FIG. 30 is a plan view of the lock mechanism of a ninth embodiment of the lock mechanism of the present invention.

FIG. 30 is a plane view showing the ninth embodiment of the present invention.

In this embodiment, lock is effected by pressing a CD case 1 with a tip 42a of a gap bar, instead of causing a gap bar 42 of the lock mechanism 3 to be present between the CD case 1 and the hard case 2.

Specifically, the storage and safety device of this embodiment employs a hard case 2 which is almost the same as that for the fourth embodiment in FIG. 12, and has a lock housing 30 installed outside the first wall 20a of the side frame 20. The device has a gap bar 42 with a U-shaped cross-section which can be inserted into or removed from a gap A for insertion or removal of the lock mechanism from a lock key insertion window 30a provided at the end of the second wall 23b for the side frame 23. When the lock mechanism 3 is in the locked state, the tip 42a of said gap bar 42 presses the side wall of the CD case 1 and the wall facing the CD case 1 is pressed against the first wall 22a of the side frame 22, making it impossible for the CD case 1 to move in the hard case 2.

When the CD case 1 is inserted into, removed from, or rotated in the hard case 2, these operations are done in the same manner as in the fourth embodiment. Any structures of the lock housing 30 and the lock key 40 for the lock mechanisms discussed above may be used in this embodiment.

FIG. 31 is a drawing illustrating the use of the lock release device using a lock release jig in the above-described embodiments.

Various types of lock mechanisms and release jigs have been discussed above. It is desirable that lock can be easily released in a shop by the use of a lock release device 60. An embodiment of the lock release device 60 is illustrated with reference to FIG. 31.

This device has a table 61 and a rail 62 formed thereon, on which a lock housing smoothly slides. A release jig 50 corresponding to the lock key 40 is interchangeably fixed at the end of the rail 62. When a hard case 2 for which the lock is intended to be released is caused to slide upright with the lock housing 30 downward in the direction of arrow Q, the release jig 30 is pushed in the lock housing 30 from the entrance for insertion of releasing jig 36. As a result, it is possible to simultaneously perform lock release and push-out of the gap bar 42 by a series of continuous operation. This is very convenient.

The application of the device is widened, if the release jig 50 is made exchangeable depending on the structure of the lock mechanism 30.

INDUSTRIAL APPLICABILITY

The storage and safety device of the present invention can be used for a wide variety of applications, such as a case for storing and preventing shoplifting of CDs, audio or video cassette tapes, computer software, or game software and other articles, from being shoplifted, or a case for storing floppy disks memorizing highly secret information.

I claim:

1. A storage and safety device, comprising:

an enclosure frame for storing an article, said enclosure frame being a parallelepiped having two pairs of side frames, and upper and lower frames, and including an opening for insertion and removal of the article and an interior configuration sized to enable said article to move, one of the side frames having a gap bar insertion opening, a lock mechanism for locking the article contained in the enclosure frame to prevent the article from being taken out, said lock mechanism being integrally formed with the enclosure frame to be inserted into and removed from a gap formed between the article stored in the enclosure frame and one of the side frames, said lock mechanism including a lock housing fixed to said side frame which is positioned next to said gap bar insertion opening, and a lock key having a lock key main body and a gap bar with a U-shaped cross-section formed at one end of the lock key main body, said gap bar being inserted into said gap bar insertion opening when said lock key main body slides in the lock housing so that said gap bar is located between the article and the side frame to thereby lock the article, and a release jig for releasing the lock mechanism.

2. The storage and safety device as claimed in claim 1, wherein said lock key main body has a spring-shaped section with a spring force and a convex key hook provided on a part of this spring-shaped section, and said lock housing has a rectangular housing part where the lock key main body of said lock key is inserted and slides and a concave part for locking at a position corresponding to said key hook in a housing wall.

3. The storage and safety device as claimed in claim 1, wherein said opening for insertion and removal of the article being stored is formed on an upper surface side of the enclosure frame.

4. The storage and safety device as claimed in claim 1, wherein said opening for insertion and removal of the article is formed on one of two pairs of the side frames of said enclosure frame, while leaving a side protection wall.

5. The storage and safety device as claimed in claim 2, wherein a configuration of said opening for insertion and removal of the article is smaller than that of the article being stored and constructed so as to be inserted into or removed from the opening for insertion and removal by slanting the article being stored.

6. The storage and safety device as claimed in claim 1, wherein the upper frame for said enclosure frame has two upper protection walls formed over two ends of a pair of side frames, said opening for insertion and removal is formed to be surrounded by said two protection walls, and said article being stored is placed close to one of the side frames of said two upper protection walls to create a gap between one of said two upper protection walls and the article being stored to enable said gap bar for the lock mechanism to be inserted into and removed from this gap.

7. The storage and safety device as claimed in claim 6, wherein the lower frame of said enclosure frame is one lower protection wall which is not layered over said two upper protection walls in a same plane, and is formed over two ends of a pair of side frames.

8. The storage and safety device as claimed in claim 1, wherein said upper frame of the enclosure frame includes four upper protection walls formed at corners of an upper side.

9. The storage and safety device as claimed in claim 1, wherein the interior configuration of said enclosure frame has a sufficient space for the article being stored to move therein to a rotating direction, the opening for insertion and removal of the article being stored is provided on an upper surface of the enclosure frame, and eaves of upper surface corner protection walls are formed around the opening for insertion and removal, said lock mechanism is constructed so that it can be inserted into or removed from the gap formed between the article being stored after it has been moved by rotation after insertion from the opening for insertion and removal and one of said side frames.

10. The storage and safety device as claimed in claim 9, wherein said opening for insertion and removal is formed in a same plane with and diagonally to the upper surface of the enclosure frame.

11. The storage and safety device as claimed in claim 9, wherein the gap for insertion and removal of the lock mechanism which is formed between the article being stored and one of the side frames by rotating the article being stored after insertion from the opening for insertion and removal is wedge-shaped.

12. The storage and safety device as claimed in claim 2, wherein said lock key main body has a spring-shaped section of a long plate with a long hole for producing a spring along its center and convex key hook provided on this spring-shaped section, and said lock housing has a rectangular housing part defining a position where the main body of said lock key is inserted and slides and a concave part for locking at a position corresponding to said key hook formed in the said housing wall.

13. The storage and safety device as claimed in claim 12, wherein said spring-shaped section has a plurality of key hooks on two sides, and said housing part has a plurality of concave parts for locking at positions corresponding to said key hooks on the walls.

14. The storage and safety device as claimed in claim 2, wherein said lock key main body has a tuning fork-shaped section with a spring force and a key hook with a convex shape formed outside this tuning fork-shaped section.

15. The storage and safety device as claimed in claim 14, wherein said tuning fork-shaped section of the lock key main body has a plurality of key hooks with a convex shape formed on two sides, and said lock housing has concave parts for locking formed at positions corresponding to the key hooks of said tuning fork-shaped section in the housing wall.

16. The storage and safety device as claimed in claim 15, wherein said lock housing has an opening for insertion of the lock key main body and, facing vis-a-vis this opening, a release jig entrance for releasing said lock key.

17. The storage and safety device as claimed in claim 16, wherein a tip of the tuning fork-shaped section is formed in an arrowhead shape which has slopes extending outwardly from an inside end to an outside end of two branches which form the tuning fork-shaped section.

18. The storage and safety device as claimed in claim 17, wherein a tip of said release jig has a shape complementary to a shape of the tip of said tuning fork-shaped section.

19. The storage and safety device as claimed in claim 18, wherein the key hook is released from said concave part for locking when the tuning fork-shaped section for the lock key main body is bent inwardly against the spring force of the tuning fork-shaped section by a pressing force from the release jig and, at the same time, lock between the article being stored and the side frame is released by push-out of the gap bar which is caused by a backward movement of the key hook main body.

20. The storage and safety device as claimed in claim 17, wherein the two branches forming the tuning fork-shaped section for the lock key main body have different lengths.

21. The storage and safety device as claimed in claim 2, wherein said lock key main body has two branches at the spring-shaped section, one branch having a convex key hook which engages the locking concave part formed on the housing wall to effect locking and the other branch having a stopper function for regulating a movement of the first branch, and said release jig urging the lock key main body with a force to move the second branch by utilizing its spring force and with a force to move the first branch to a space produced by the movement of the second branch, thereby releasing a lock of the key hook.

22. The storage and safety device as claimed in claim 2, wherein said lock key main body has two branches at the spring-shaped section arranged parallel to a plane direction, one branch having a convex key hook which engages a locking concave part formed on the housing wall to effect locking and the other branch having a stopper function for regulating a movement of the first branch, and said release jig urging the lock key main body with a force to move the second branch to a sectional direction by utilizing its spring force and with a force to move the first branch to a space produced by the movement of the second branch, thereby releasing a lock of the key hook.

23. The storage and safety device as claimed in claim 2, wherein said lock key main body has two branches at the spring-shaped section arranged parallel to a sectional direction, one branch having a convex key hook which engages a locking concave part formed on the housing wall to effect locking and the other branch having a stopper function for regulating a movement of the first branch, and said release jig urging the lock key main body with a force to move the second branch to a plane direction by utilizing its spring force and with a force to move the first branch to a space produced by the movement of the second branch, thereby releasing a lock of the key hook.

24. The storage and safety device as claimed in claim 21, wherein said release jig provides said lock key main body with a force to push out the gap bar from the gap bar insertion opening of said enclosure frame by sliding in the housing part.

25. The storage and safety device as claimed in claim 2, wherein said lock key main body has two key hooks on a part of the spring-shaped section, said two key hooks corresponding to two concave parts formed respectively on different walls of the housing part, and said release jig provides a force to deform said spring-shaped section to a direction so that the two key hooks are simultaneously released.

26. The storage and safety device as claimed in claim 25, wherein said two locking concave parts are provided on the two walls crossing at right angle in the housing part, and said release jig provides the spring-shaped section with a deforming force in a diagonal direction to simultaneously release the two key hooks by sliding in the housing part.

27. The storage and safety device as claimed in claim 24, wherein said lock housing has an opening for insertion of the lock key main body and an entrance for insertion of the release jig at positions facing each other, and wherein release of the key hook and push-out of the gap bar can be performed at the same time by inserting and pressing the release jig from the release jig insertion entrance.

\* \* \* \* \*